US011316575B2

(12) United States Patent
Levy et al.

(10) Patent No.: US 11,316,575 B2
(45) Date of Patent: Apr. 26, 2022

(54) MULTIPLE CHANNEL QUALITY INDICATOR (CQI) REPORTS FOR LINK ADAPTATION

(71) Applicant: QUALCOMM INCORPORATED, San Diego, CA (US)

(72) Inventors: Sharon Levy, Binyamina (IL); Guy Wolf, Rosh Haayin (IL)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/862,517

(22) Filed: Apr. 29, 2020

(65) Prior Publication Data

US 2021/0344399 A1    Nov. 4, 2021

(51) Int. Cl.
*H04B 7/06* (2006.01)
*H04B 7/0452* (2017.01)

(52) U.S. Cl.
CPC ......... *H04B 7/0632* (2013.01); *H04B 7/0626* (2013.01); *H04B 7/0634* (2013.01); *H04B 7/0452* (2013.01)

(58) Field of Classification Search
CPC .. H04B 7/0626; H04B 7/0632; H04B 7/0417; H04B 7/0452; H04B 7/0619; H04B 7/0634; H04B 7/0486
USPC ................................. 375/267, 299, 347–349
See application file for complete search history.

(56) References Cited

U.S. PATENT DOCUMENTS

| | | | |
|---|---|---|---|
| 9,030,975 B2 | 5/2015 | Wang et al. | |
| 9,986,540 B2 | 5/2018 | Kim et al. | |
| 10,623,081 B2 | 4/2020 | Levitsky et al. | |
| 2005/0136840 A1* | 6/2005 | Molnar | H04L 5/006 |
| | | | 455/63.1 |

(Continued)

FOREIGN PATENT DOCUMENTS

CN    106209308 A    12/2016

OTHER PUBLICATIONS

Zayadi H., et al., "Increase Throughput by Expectation Channel Quality Indicator", Oct. 14-17, 2014, 2014 First International Scientific-Practical Conference, Problems of Infocommunications. Science and Technology, Kharkiv, Ukrain, pp. 120-121.

(Continued)

*Primary Examiner* — Emmanuel Bayard
(74) *Attorney, Agent, or Firm* — Qualcomm Incorporated

(57) ABSTRACT

Methods related to wireless communication systems and performing link adaption for multiple user-multiple-input multiple-output (MU-MIMO) communications using multiple expected channel quality indicators are presented. A base station (BS) transmits, to a first user equipment (UE) of a plurality of UEs, a channel state report configuration indicating a set of one or more measurement resources and at least one of precoding information or rank indications associated with the set of one or more measurement resources. The BS receives, from the first UE, a channel state report including a plurality of expected channel quality indicators (CQIs) over a time period based on the set of one or more measurement resources and the at least one of the precoding information or rank indications. The BS uses the channel state report to determine a link adaptation for the first UE. Other features are also claimed and described.

26 Claims, 12 Drawing Sheets

(56) References Cited

U.S. PATENT DOCUMENTS

| | | | | |
|---|---|---|---|---|
| 2012/0287875 | A1* | 11/2012 | Kim | H04W 76/27 370/329 |
| 2013/0329691 | A1* | 12/2013 | Kim | H04L 5/001 370/329 |
| 2014/0056156 | A1* | 2/2014 | Jongren | H04L 1/0077 370/252 |
| 2014/0226612 | A1* | 8/2014 | Kim | H04L 5/0057 370/329 |
| 2014/0241454 | A1* | 8/2014 | Kim | H04L 5/0057 375/267 |
| 2014/0376430 | A1* | 12/2014 | Su | H04W 52/0212 370/311 |
| 2015/0003269 | A1 | 1/2015 | Chun et al. | |
| 2015/0078271 | A1* | 3/2015 | Kim | H04L 5/0051 370/329 |
| 2016/0262166 | A1* | 9/2016 | Wong | H04L 1/0015 |
| 2018/0294848 | A1* | 10/2018 | Park | H04W 24/10 |
| 2018/0323830 | A1* | 11/2018 | Park | H04B 7/024 |
| 2019/0261380 | A1 | 8/2019 | Iyer et al. | |
| 2019/0281487 | A1* | 9/2019 | Liu | H04L 5/0048 |

OTHER PUBLICATIONS

Huawei., et al., "Introduction of NR eURLLC", 3GPP TSG-RAN Meeting #87, 3GPP Draft; RP-200343, 3rd Generation Partnership Project (3GPP), Mobile Competence Centre, 650, Route Des Lucioles, F-06921 Sophia-Antipolis Cedex, France, vol. RAN WG2, No. Feb. 24, 2020-Mar. 6, 2020, Mar. 12, 2020, 8 Pages, www.3gpp.org/ftp/TSG_RAN/TSG_RAN/TSGR_87e/Docs/RP-200343. 3GPP TSG-RAN WG2 Meeting #109 electronic, 38300 CR0200r1 (Rel-16) R2-2002315, Introduction of NR eURLLC.doc [retrieved on Mar. 12, 2020], Paragraph 5.2.5.1.

Interdigital Communications., et al., "Interference Measurements for Multiple CSIs", 3GPP TSG-RAN WG1 Meeting #70, 3GPP Draft; R1-123400 Interference Measurements for Multiple CSIs, 3rd Generation Partnership Project (3GPP), Mobile Competence Centre, vol. RAN WG1, No. Qingdao, China, Aug. 13, 2012-Aug. 17, 2012, Aug. 5, 2012, 6 Pages, XP050661287, Retrieved from the Internet: URL: https://www.3gpp.org/ftp/tsg_ran/wg1_rL1/TSGR1_70/Docs/, [retrieved on Aug. 5, 2012], Paragraph 1.

International Search Report and Written Opinion—PCT/US2021/028264—ISA/EPO—dated Jul. 29, 2021.

\* cited by examiner

MULTIPLE CHANNEL QUALITY INDICATOR (CQI) REPORTS FOR LINK ADAPTATION

TECHNICAL FIELD

The technology described below relates generally to wireless communication systems, and more particularly to multi-user multiple input and multiple output (MU-MIMO) scheduling. Certain embodiments can enable and provide techniques allowing a base station to efficiently obtain interference measurement information and/or channel variation information from user equipment devices for MU-MIMO scheduling.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices (e.g., user equipment (UE)).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. As use cases and diverse deployment scenarios continue to expand in wireless communication, coding technique improvements may also yield benefits.

In multi-user multiple input and multiple output (MU-MIMO) communications, devices may employ multiple antennas ports simultaneously to transmit and/or receive signals in multiple spatial directions. When a base station (BS) seeks to communicate with multiple UEs in parallel (e.g., simultaneously using the same frequency allocation) using MU-MIMO, it may decide which UEs to multiplex spatially for simultaneous communication. For example, UEs which are spatially close may suffer from greater mutual interference than UEs which are spatially distant, so a BS may group UEs that are further apart for parallel or simultaneous communication. Deciding which UEs to multiplex in a group may involve obtaining various interference measurements from the UEs, but current methods of scheduling a group of UEs for parallel communication may fail to adequately account for mutual interference between specific UEs that may be grouped together.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Some aspects of the present disclosure enable and provide mechanisms and techniques enabling improved outer loop link adaptation (OLLA) in an MU-MIMO setting. For instance, a BS may configure a UE to transmit expected channel quality indicator (CQI) reports at certain time intervals based on predicted interference. Thus, the BS may receive CQI reports and estimate channel variations during time periods when the BS has no data transmissions to the UE. This may allow the BS to prepare for link adaptation when the BS receives data for transmission to the UE. Additionally, OLLA may be improved by augmenting channel state feedback reports with modulation and coding scheme (MCS) recommendations per potential rank. The BS may also configure the UE to report a history of CQIs and corresponding rank indices and/or precoding matrix indicators. The history information may allow the BS to rule out or exclude CQIs during periods of jitter when performing OLLA.

For example, in an aspect of the disclosure, a method of wireless communication includes transmitting, by a base station (BS) to a first user equipment (UE) of a plurality of UEs, a channel state report configuration indicating a set of one or more measurement resources and at least one of precoding information or rank indications associated with the set of one or more measurement resources. The method further includes receiving, by the BS from the first UE, a channel state report including a plurality of expected channel quality indicators (CQIs) over a time period based on the set of one or more measurement resources and the at least one of the precoding information or rank indications. The method further includes determining, by the BS, a link adaptation for the first UE based at least in part on the received channel state report.

In an additional aspect of the disclosure, a method of wireless communication includes receiving, by a UE from a BS, a channel state report configuration indicating a set of one or more measurement resources and at least one of precoding information or rank indications associated with the set of one or more measurement resources. The method further includes transmitting, by the UE to the BS, a channel state report including a plurality of expected CQIs over a time period based on the set of one or more measurement resources and the at least one of the precoding information or rank indications.

In an additional aspect of the disclosure, a BS includes a transceiver configured to transmit, to a first UE of a plurality of UEs, a channel state report configuration indicating a set of one or more measurement resources and at least one of precoding information or rank indications associated with the set of one or more measurement resources. The transceiver is further configured to receive, from the first UE, a channel state report including a plurality of expected CQIs over a time period based on the set of one or more measurement resources and the at least one of the precoding information or rank indications. The BS further includes a processor configured to determine a link adaptation for the first UE based at least in part on the received channel state report.

In an additional aspect of the disclosure, a UE includes a processor and a transceiver. The transceiver is configured to receive, from a BS, a channel state report configuration indicating a set of one or more measurement resources and at least one of precoding information or rank indications associated with the set of one or more measurement resources. The transceiver is further configured to transmit, to the BS, a channel state report including a plurality of expected CQIs over a time period based on the set of one or more measurement resources and the at least one of the precoding information or rank indications.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
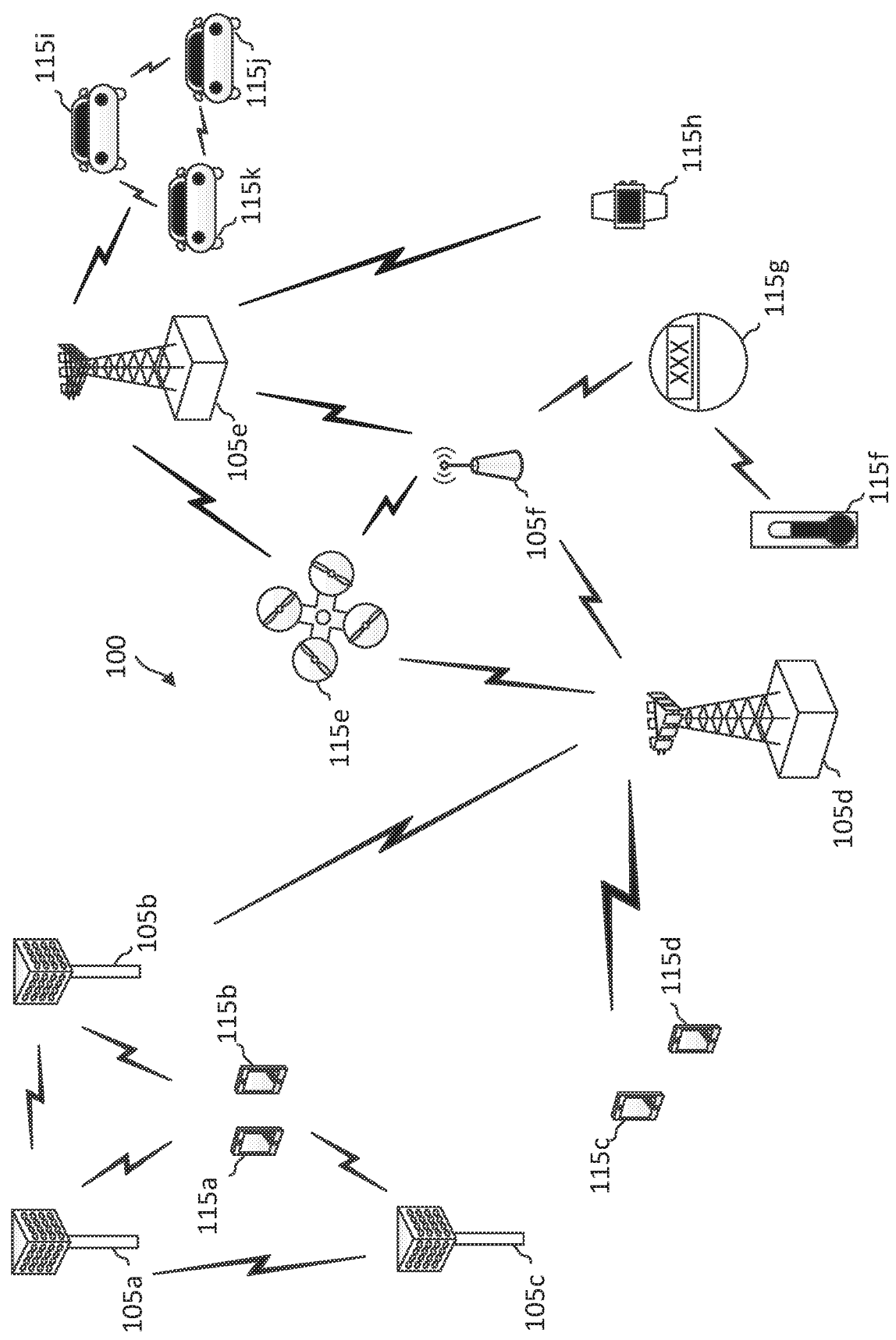
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Base stations (BSs) in 5G NR are capable of using multiple antenna ports to communicate with multiple user equipment (UE) devices in parallel, a process known as multi-user multiple-input multiple-output (MU-MIMO). An antenna port may refer to a physical antenna element or a virtual or logical antenna port formed from multiple physical antenna elements with certain per-antenna element amplitude and/or phase weightings. For instance, a base station (BS) may group UEs that are spatially distant from each other and multiplex the group of UEs for parallel or simultaneous transmissions. Existing methods of scheduling a group of UEs for parallel communication employed by BSs may fail to account for mutual interference between specific UEs that may be grouped together. For example, a BS may configure each UE with resources for non-zero power channel state information reference signal (NZP-CSI-RS) transmission. The BS may configure each UE with several NZP-CSI-RS resources in a resource set. The NZP-CSI-RS may be one of two types: (1) An NZP-CSI-RS for channel response estimation or (2) an NZP-CSI-RS for interference estimation. An NZP-CSI-RS for channel response estimation is a pilot (e.g., a reference signal) transmitted by a transmit antenna (or antenna port) prior to precoding (i.e., without precoding) and can be used by a UE to measure a downlink channel (e.g., a radio signal propagation channel) associated with the antenna or antenna port. If there are multiple resources, each resource may have its own pilots. An NZP-CSI-RS for interference estimation is a pre-coded pilot, where the precoding is configured in the same way data would be transmitted to another UE (e.g., an interfering UE) so that the measuring UE may estimate interference from the other UE.

Each UE may perform channel estimation from received NZP-CSI-RSs for channel response estimation, perform interference measurement from received NZP-CSI-RS for interference estimation, create a channel state feedback (CSF) report based on channel response estimation and/or interference estimation, and transmit the CSF report to the BS. In some examples, the CSF report may include a channel state information reference signal resource indication (CRI), which is a channel state information reference signal (CSI-RS) resource index, indicating a CSI-RS preferred by the UE based on the UE's channel response estimation and/or interference estimation. Each CRI may identify an NZP-CSI-RS resource. In some examples, there may be a one-to-one mapping between a CRI and an antenna port at the BS. In other words, each CRI may identify a resource for a corresponding antenna port to transmit a pilot. In some other examples, a CRI may identify a resource location for a group of antenna ports to transmit a pilot. For instance, when the number of antenna ports at a BS exceeds a limit, which may be predefined value (e.g., 2, 4, 8, 12, 16, 24, 32, or another value as may be defined in, for example, a 3GPP standard), the BS may group antenna ports for CSI-RS transmission. For example, the BS may have about 256 antenna ports, while the standard may allow for a maximum of 32 ports. Thus, the BS may form, for example, 32 groups of antenna ports with eight antenna ports in each group. As such, each CRI may correspond to one of the 32 groups of antenna ports. The CSF report may also include channel quality information (CQI), a rank indicator (RI), and a precoding matrix indicator (PMI) for the preferred CSI-RS resource indicated by the CRI. In some other examples, the CSF report may include RIs, PMIs, and/or CQIs for each configured CSI-RS resource.

While UEs can determine potential interference from other UEs in an MU-MIMO group, the BS may require some knowledge of the downlink channel for each UE served by the BS (e.g., via channel state information feedback or channel reciprocity), a MU-MIMO prescheduling configuration (e.g., a grouping of candidate UEs for MU-MIMO), and potential precodings to be used for each candidate UE. The BS may then transmit appropriate NZP-CSI-RSs corresponding to each precoding. For example, for a group of four UEs, UE 0, UE 1, UE 2 and UE 3, the BS may transmit to each UE an NZP-CSI-RS (e.g., NZP-CSI-RS #0-NZP-CSI-RS #3) with various precoding options that the BS may potentially use to communicate with each of the other UEs in the group. For instance, the BS may transmit pilots without precoding on NZP-CSI-RS #0 for UE 0 to estimate a channel response, transmit pilots with potential precoding for UE 1 on NZP-CSI-RS #1 for UE 0 to estimate interference from UE 1, transmit pilots with potential precoding for UE 2 on NZP-CSI-RS #2 for UE 0 to estimate interference from UE 2, and transmit pilots with potential precoding for UE 3 on NZP-CSI-RS #3 for UE 0 to estimate interference from UE 3. The BS may repeat a similar process for UE 1, UE 2, and UE 3 to estimate a channel response and estimate interference from each of the other UEs in the group. As can be observed, the number of precoding combinations for the NZP-CSI-RS #0, #1, #2, and #3 can be large, and thus the system overhead in terms of resource utilization, measurement processing and/or time may be significant, making link adaptation difficult.

Further, existing channel state feedback (CSF) reporting mechanisms may not allow for optimum outer loop link adaptation (OLLA). Link adaption generally refers to wireless devices selecting appropriate transmission parameters (e.g., a modulation coding scheme (MCS)) for a given channel state at a given time instant. OLLA, specifically, aims to adapt a radio link to keep the block error rate (BLER) for a transmission below a target threshold. For example, a BS may select an MCS for a first transmission to a UE to achieve a certain performance (e.g., a BLER target) based on a channel condition at a first time instant. If the channel condition remains similar, the BS may use the same MCS for a second transmission and achieve a similar BLER satisfying the BLER target for the second transmission. If the channel condition degrades at a third time instant and the BS continues to use the same MCS for a third transmission, the BS may detect an increase in the BLER failing to satisfy the BLER target. The BS may perform OLLA to detect the change in BLER and select a lower MCS level (e.g., offset from a previous MCS) for a subsequent transmission so that the target BLER may be maintained. In some examples, the UE may also report CQIs to the BS (based on the received transmissions) and the BS may determine variations in the channel based on the reported CQIs and adjust MCSs for communications with the UE based on the channel variations.

Accordingly, OLLA may be useful when handling mismatches in physical downlink shared channel (PDSCH) allocation with respect to CSF allocation. OLLA may also be useful when devices experience a different noise profile than one previously indicated in a channel state information for an interference measurement (CSI-IM) signal, for example, due to channel variations over time. Further, OLLA may compensate for CSF reporting delays. For example, there may be a lag between the time when the CSF is generated at a device or UE and the time when the CSF report is sent to a BS, where the channel may have changed during the lag. However, OLLA may only track a CQI (or MCS) offset using the latest rank index (RI) and/or precoding matrix indicator (PMI) values returned in a CSF report, which limits the ability of OLLA to determine an accurate CQI (or MCS) offset estimate when a signal experiences jitter with respect to its RI and/or PMI. As a result, maximum throughput for high MCS values may also be limited. Further, OLLA may be limited to tuning or adapting MCSs (with given RI and/or PMI) to achieve the desired BLER, and may be limited in its ability to tune the RI and PMI to adapt to variations in the channel.

The present disclosure provides techniques for a BS to obtain interference measurement information from UEs for parallel scheduling using MU-MIMO techniques without transmitting a large number of pre-coded CSI-RSs to the UEs. Instead of transmitting NZP-CSI-RSs for interference for the possible precoded interfering streams or layers, the BS may instead provide precoding information to each UE to allow the UEs to reconstruct the interfering streams using common pilots (i.e. NZP-CSI-RSs for channel response) to account for potential interference from other UEs being considered for scheduling in parallel. The parallel scheduling or parallel communications may refer to a BS receiving a UL signal (e.g., a UL data stream) from each UE in a group of MU-MIMO UEs simultaneously (via different spatial layers or spatial directions) or transmitting a DL signal (e.g., a DL data stream) to each UE in the group of MU-MIMO UEs simultaneously (via different spatial layers or spatial directions). An NZP-CSI-RS can be used for both channel estimation and interference measurement. For instance, continuing with the above example of UEs 0-3, the BS may transmit pilots without precoding on NZP-CSI-RS #0 for UE 0 to estimate a channel response and configure UE 0 with a list of potential precodings (e.g., a precoding matrix index or codebook index) that the BS may use for UE 1, UE 2, and/or UE 3. UE 0 may estimate interference for each precoding in the list based on the estimated channel response and corresponding precoding instead of having the BS transmit NZP-CSI-RSs with different precoding combinations. Accordingly, the BS may transmit a list of NZP-CSI-RS resource indices and corresponding precoding information and each UE may feed back a CSF report indicating a selected NZP-CSI-RS resource configuration and/or corresponding precoding that may create the least amount of interference at the UE.

For example, according to aspects of the present disclosure, a BS may transmit a CSF configuration to each connected UE, indicating an NZP-CSI-RS resource and requesting precoding, rank, and/or channel quality information from the UEs. After the UEs return CSF including the requested parameters, the BS may then create an extended CSF configuration including information about other UEs (i.e., interferers) which might be grouped with the receiving UE. The extended CSF configuration may include an indication of a list of NZP-CSI-RS resources and one or more precoding parameters that may potentially be used with a transmission in a resource indicated by each NZP-CSI-RS resource in the list. The list of NZP-CSI-RS resources may be in the form of resource configuration indices indicating NZP-CSI-RS resources. Alternately, the BS may send the extended configuration without first receiving an initial CSF report from the UEs. The BS may then trigger the UEs to report CSF information for potential precoding configurations at the BS, or receive the CSF reports—absent a trigger—through periodic data transfers.

In some aspects, a UE may transmit a CSF report via the medium access control (MAC) layer. For example, the BS may request from a first UE a recommended PMI, and CQI, and RI information for each NZP-CSI-RS resource in the list of NZP-CSI-RS resource, accounting for potential interference resulting from an expected communication between the BS and a second UE. The BS may request multiple CSF reports based on different potential configurations, e.g., different combinations of UEs. The interference measurement/estimate information determined by the UE for inclusion in the reports may be based on the same NZP-CSI-RS signal used for channel estimation. For instance, the UE may perform channel/interference estimation for each NZP-CSI-RS resource-precoding combination, select an NZP-CSI-RS resource-precoding combination that may create the least amount of interference to the UE, and feed back the measurement information and/or selection (e.g., including a CRI indicating the selected NZP-CSI-RS resource) in a CSF report to the BS. The BS may then, based on the CSF report, make a scheduling determination regarding which UEs to group for parallel communication and the configurations (e.g., precoding and/or modulation coding scheme (MCS)) for each UE in the group for MU-MIMO.

The present disclosure also provides techniques for improving OLLA by utilizing similar interference prediction-based CSF reporting techniques discussed above. For instance, a BS may configure a UE to report expected CQIs at certain time intervals over a period of time based on predicted interference. Thus, the BS may receive CQI reports and estimate channel variations during time periods when the BS has no data transmissions to the UE. This may allow the BS to prepare for link adaptation when the BS receives data for transmission to the UE. Additionally, the OLLA may be improved by augmenting CSF reports with MCS recommendations per potential rank, rather than reporting the best MCS corresponding to the current rank recommendation (or the best rank estimated by a UE or in use by the UE for a current communication). For example, the BS may configure the UE with a list of RIs and/or a list of PMIs and the UE may report a recommended MCS for each PMI in the list, each RI in the list, and/or each combination of PMI and RI in the list. The BS may also configure the UE to report a history of CQI and corresponding RIs and/or PMIs. The history information may allow the BS to rule out or exclude CQIs during the jitter periods when performing OLLA.

Aspects of the present disclosure can provide several benefits. For example, aspects of the present disclosure enable a BS to more effectively group UEs for MU-MIMO without additional CSI-RS transmission overhead. Aspects of the present disclosure may also improve overall network resource utilization by using a single NZP-CSI-RS for both channel estimation and interference measurement, freeing resources that would otherwise be occupied by an NZP-CSI-RS for channel estimation and different NZP-CSI-RSs specifically for interference measurement. Aspects of the present disclosure may also improve OLLA, for example, by mitigating the effects of jitter on CQI determinations. While the present disclosure is described in the context of LTE and/or NR networks, the present disclosure may be applied to any wireless communication technologies that implements MU-MIMO. The present disclosure is also suitable for use in TDD systems or FDD systems. Additionally, the interference prediction-based CSF and/or CQI reporting can be used in conjunction with legacy interference measurement-based CSF and/or CQI reporting mechanisms.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 may be dispersed throughout the wireless network 100, and each UE 115 may be stationary or mobile. UEs can take in a variety of forms and a range of form factors. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. The random access procedure (or RACH procedure) may be a single or multiple step process. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a backoff indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. Scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, a BS 105 may transmit a CSF configuration to multiple connected UEs 115, indicating an NZP-CSI-RS resource and requesting precoding, rank, and/or channel quality information from the UEs 115. After the UEs 115 return CSF including the requested parameters, the BS 105 may then create an extended CSF configuration including information about other UEs 115 (i.e., interferers) which might be grouped with the receiving UE 115. The extended CSF configuration may include a list of NZP-CSI-RS resources and one or more precoding parameters that may potentially be used with a transmission in a resource indicated by each NZP-CSI-RS resource in the list. The list of NZP-CSI-RS resources may be in the form of resource configuration indices indicating NZP-CSI-RS resources. Alternately, the BS 105 may send the extended configuration without first receiving an initial CSF report from the UEs 115. The BS 105 may then trigger the UEs 115 to report CSF information for potential precoding configurations at the BS 105, or receive the CSF reports—absent a trigger—through periodic data transfers. The CSF reports may be transmitted from the UEs 115 on the MAC layer. For example, the BS 105 may request from a first UE a recommended PMI, and CQI, and RI information for each NZP-CSI-RS resource in the list of NZP-CSI-RS resources, accounting for potential interference resulting from communication between the BS 105 and a second UE 115. The BS 105 may request multiple CSF reports based on different potential configurations, e.g., different combinations of UEs 115. The interference measurement/estimates information performed by the UE 115 for inclusion in the reports may be based on the same NZP-CSI-RS signal used for channel estimation. For instance, the UE 115 may perform channel/interference estimation for each NZP-CSI-RS resource-precoding combination, select an NZP-CSI-RS resource-precoding combination that may create the least amount of interference to the UE 115, and feed back the measurement information and/or selection (e.g., including a CRI indicating the selected NZP-CSI-RS resource) in a CSF report to the BS 105. The BS 105 may then, based on the CSF reports, make a scheduling determination regarding which UEs 115 to group for parallel communication (e.g., simultaneous communication) and the configurations (e.g., precoding and/or modulation coding scheme (MCS)) for each UE 115 in the group for MU-MIMO.

Figure 2:
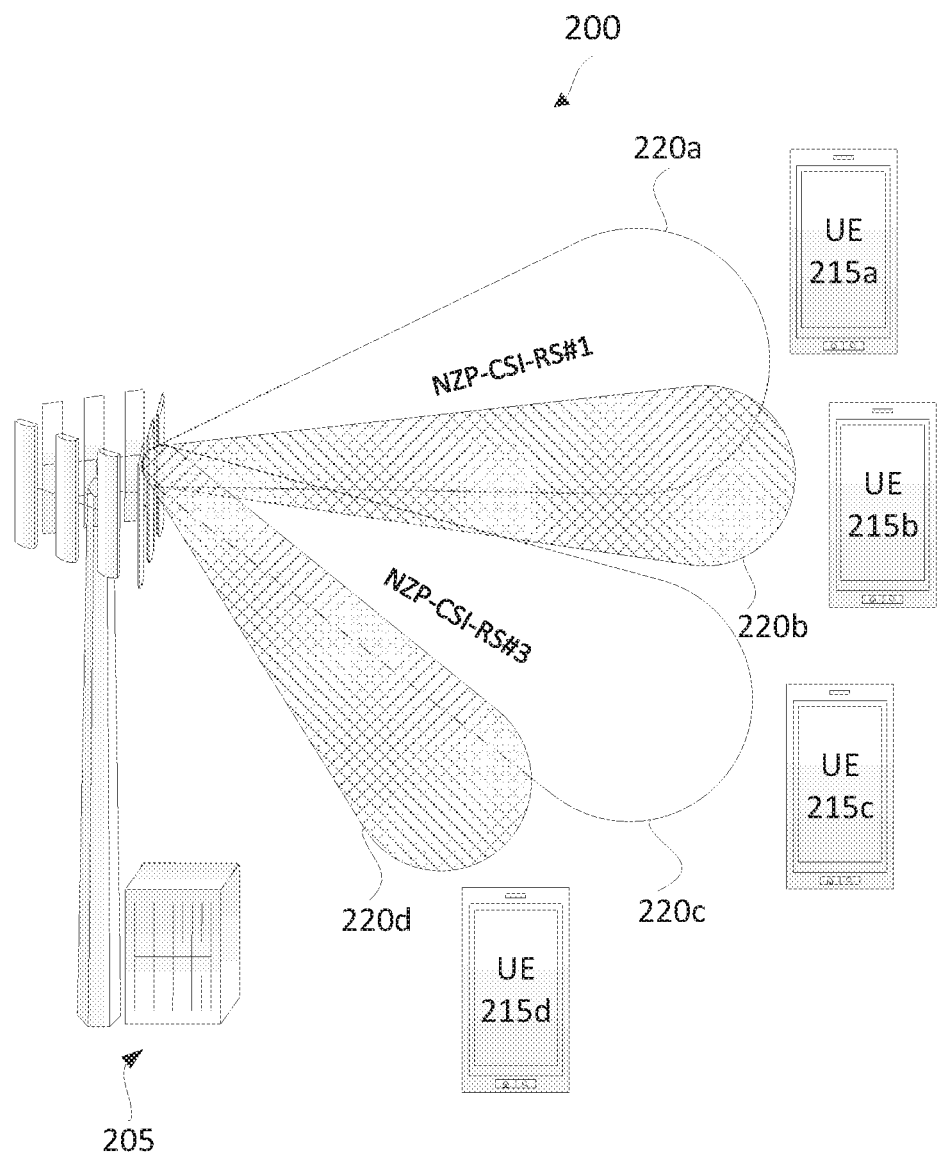
FIG. 2 illustrates a wireless communication network according to some aspects of the present disclosure.

FIG. 2 illustrates a wireless communication network 200 according to some aspects of the present disclosure. Though only one BS 205 (which may be a BS 105) and four UEs 215 (which may be UEs 115) are illustrated for simplicity, embodiments of the present disclosure may scale to any number of BSs 205 and UEs 215. The BS 205 may communicate with multiple UEs 215, using beams 220. For example, BS 205 may communicate with UE 215a using beam 220a, with UE 215b using beam 220b, with UE 215c using beam 220c, and with UE 215d using beam 220d. When determining how to group (i.e., multiplex) multiple UEs 215 for MU-MIMO parallel communications, UEs 215 which are spatially close may suffer from mutual interference that would make combining the UEs 215 in the same group detrimental to system performance. For example, beams 220a and 220b used for communicating between BS 205 and UEs 215a and 215b, respectively, significantly overlap, which might create a large amount of mutual interference between UEs 215a and 215b if communications between the BS 205 and UEs 215a and 215b were multiplexed for simultaneous transmissions. Thus, it may not be desirable for BS 205 to combine UE 215a and 215b into a group for parallel MU-MIMO communications. However, beams 220a and 220c used for communicating between BS 205 and UEs 215a and 215c, respectively, have little overlap, which may lead to significantly less interference between UEs 215a and 215c than what would be expected between UEs 215a and 215b. Thus, BS 215 may group UEs 215a and UE 215c together for parallel MU-MIMO communications and expect better performance than if it were to group UEs 215a and 215b together. For the same reason, BS 215 may group UEs 215b and 215d together, resulting in two groups for parallel MU-MIMO communications. Any combination of UEs 215 are possible (e.g., UEs 215a, 215c, and 215d in one group, and UE 215b in its own group, or UEs 215a and 215d in one group, and UEs 215b and 215c in another), with different degrees of mutual interference between the UEs in each group.

Figure 3:
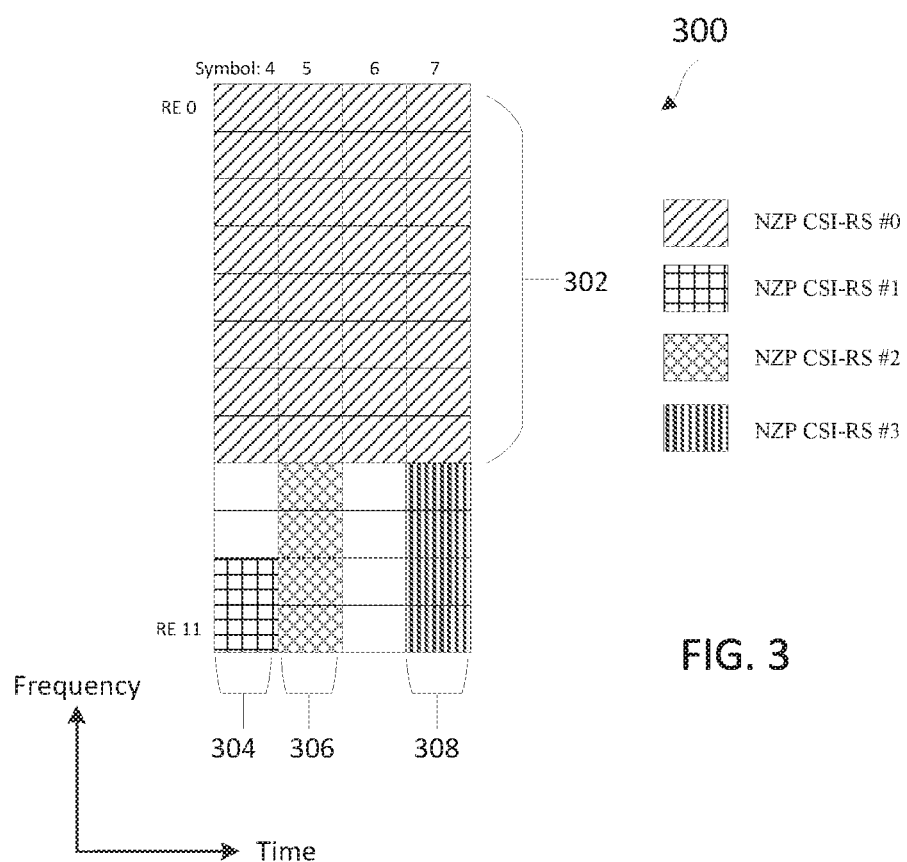
FIG. 3 illustrates an exemplary non-zero power channel state information-reference signal (NZP-CSI-RS) resource allocation and transmission scheme for multi-user multiple-input and multiple-output (MU-MIMO) according to some aspects of the present disclosure.

FIG. 3 illustrates an exemplary NZP-CSI-RS resource allocation and transmission scheme 300 for MU-MIMO according to some aspects of the present disclosure. The scheme 300 may be employed, for example, by a BS 205 requesting channel estimation and interference measurements from a UE 215. In FIG. 3, the x-axis may represent time in some arbitrary units, and the y-axis may represent frequency in some arbitrary units.

The scheme 300 may involve one BS 205 and four UEs 215 (e.g., UEs 215a-215d). The BS 205 may configure UE 215a with resources (e.g., time-frequency resources) for transmissions of NZP-CSI-RS 302, NZP-CSI-RS 304, NZP-CSI-RS 306 and NZP-CSI-RS 308. NZP-CSI-RS 302, NZP-CSI-RS 304, NZP-CSI-RS 306 and NZP-CSI-RS 308 are also shown as NZP-CSI-RS #0, NZP-CSI-RS #1, NZP-CSI-RS #2, and NZP-CSI-RS #3, respectively, in FIG. 3. The BS 205 may transmit NZP-CSI-RS 302 to UE 215a for channel estimation, and NZP-CSI-RSs 304, 306, and 308 for interference measurement. For instance, NZP-CSI-RS 302 may include pilots (without precoding) for UE 215a to use for channel estimation. The BS 205 may include pilots precoded with potential precoding for UE 215b in NZP-CSI-RS 304 for UE 215a to estimate interference from UE 205b, include pilots with potential precoding for UE 205c on NZP-CSI-RS 306 for UE 215a to estimate interference from UE 215c, and include pilots precoded with potential precoding for UE 215d on NZP-CSI-RS 308 for UE 215a to estimate interference from UE 215d. Precoding may include weighting amplitudes and/or phases of signals at different antenna ports to beamform a signal such that the signal power is focused in a certain spatial direction (e.g., the beams 220 of FIG. 2). Referring to the example shown in FIG. 2, the BS 205 may transmit the NZP-CSI-RS 304 in a beam direction similar to the beam 220b, transmit the NZP-CSI-RS 306 in a beam direction similar to the beam 220c, and transmit the NZP-CSI-RS 308 in a beam direction similar to the beam 220d for the UE 215a to measure interferences from the UEs 215b, UE 215c, and UE 215d, respectively. The BS may repeat a similar process for each of the UEs 215b, 215c, and 215d to estimate a channel response and estimate interference from each of the other UE 215 that may be grouped together for parallel MU-MIMO communication.

While a BS may apply the scheme 300 to obtain interference measurement information from serving UEs and determine MU-MIMO scheduling, the BS may have to transmit many different combinations of pre-coded reference signals for different UEs. As the number of UEs increases (e.g., to 16, 32, 64, 100 or more) and/or the number of antenna ports increases (e.g., to 8, 16, 64, 128, 256 or more for massive MIMO), the number of combinations of pre-coded reference signals can be large, and thus the scheme 300 may not be practical (e.g., incurring large resource overhead) and may be difficult to manage.

Accordingly, the present disclosure provides techniques for a BS to obtain interference information from UEs by transmitting precoding hypotheses (e.g., precoding matrices and/or codebook indices) instead of having to transmit many combinations of pre-coded signals.

Figure 4:
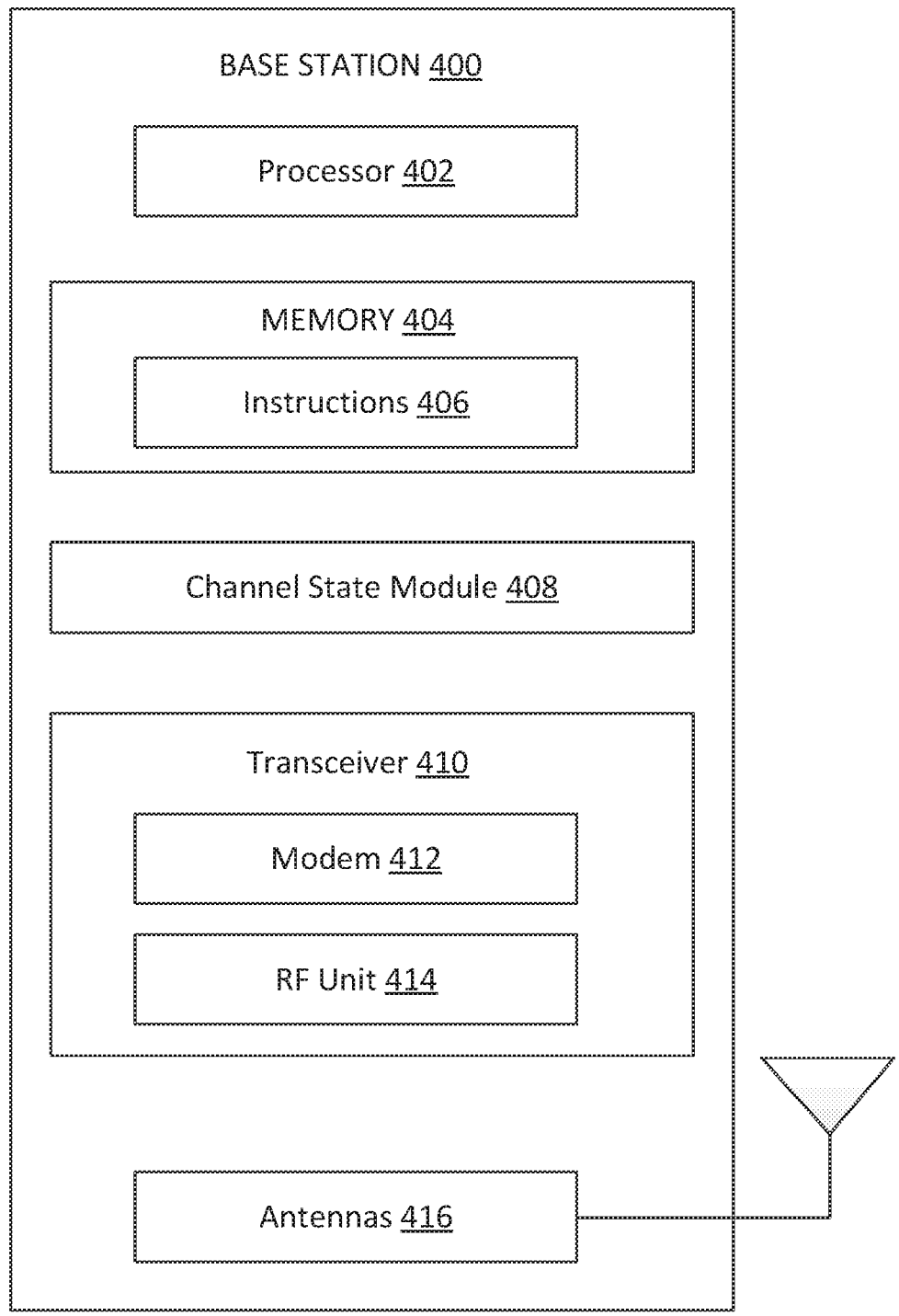
FIG. 4 is a block diagram of an exemplary base station (BS) according to some aspects of the present disclosure.

FIG. 4 is a block diagram of an exemplary BS 400 according to some aspects of the present disclosure. The BS 400 may be a BS 105 in the network 100 as discussed above in FIG. 1. As shown, the BS 400 may include a processor 402, a memory 404, a channel state module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. 6-9 and 11. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The channel state module 408 may be implemented via hardware, software, or combinations thereof. For example, the channel state module 408 may be implemented as a processor, circuit, and/or instructions 406 stored in the memory 404 and executed by the processor 402. In some examples, the channel state module 408 can be integrated within the modem subsystem 412. For example, the channel state module 408 can be implemented by a combination of software components (e.g., executed by a DSP or a general processor) and hardware components (e.g., logic gates and circuitry) within the modem subsystem 412.

The channel state module 408 may be used for various aspects of the present disclosure, for example, aspects of FIGS. 6-9 and 11. For example, the channel state module 408 may prepare and transmit a channel state report configuration to a first UE 115 of a plurality of UEs 115 which the BS 400 intends to partition into groups for MU-MIMO communications. The channel state report configuration may be transmitted through media access control (MAC) signaling, and may indicate a set of one or more interference measurement resources (e.g., the resources and precoding information associated with the interference measurement resources. For instance, the channel state report configuration may indicate a PMI for each resource of the set of interference measurement resources. As part of transmitting the channel state report configuration, the channel state module 408 may also transmit a PMI associated with the first UE 115. The precoding information may include a second PMI associated with a first interference measurement resource of the set of interference measurement resources. Effectively, the channel state module 408 may be configured to transmit a list of precodings with each precoding corresponding to one of various UEs 115 for which the BS seeks to have the first UE 115 determine interference measurement information (e.g., as discussed more fully below in relation to FIGS. 6 and 7).

The channel state module 408 may also be configured to transmit a reference signal (e.g., an NZP-CSI-RS, in coordination with the transceiver 410) to the first UE 115 for the first UE 115 to perform channel response estimation, and interference measurement to determine interference between the first UE 115 and other UEs 115 in the plurality of UEs 115. The reference signal may be transmitted in a channel response measurement resource different than those in the set of interference measurement resources. The channel state module 408 may also be configured to refrain from transmitting a second reference signal in the set of interference measurement resources, since the UE 400 may perform both channel estimation and interference measurement using the NZP-CSI-RS (e.g., as discussed more fully below in relation to FIGS. 6 and 7).

The channel state module 408 may also be configured to receive a channel state report (e.g., a CSF report, or just CSF) from the first UE 115 (in coordination with the transceiver 410) including interference prediction information based on the set of interference measurement resources and the precoding information transmitted to the first UE 115.

In some aspects, the channel state report may be based on the first reference signal and may include interference prediction information, including a rank indicator (RI), a precoding matrix indicator (PMI), and/or an expected channel quality indicator (CQI) associated with the first UE 115 based on a first predicted interference associated with a first interference measurement resource of the set of interference measurement resources and a corresponding first PMI. The channel state report may indicate that the first predicted interference associated with the first interference measurement resource and the corresponding first PMI among the set of one or more interference measurement resources and corresponding PMIs provides a least amount of interference to the first UE 115. The channel state report may also include an RI and/or an expected CQI associated with the first UE 115 based on predicted interference associated with the first interference measurement resource and the second PMI. In other words, the BS 400 may receive from the first UE 115 an interference configuration indicating the least damaging configuration from the among the options provided to the first UE 115. In some aspects, the channel state report may be timestamped.

The channel state module 408 may also determine a group configuration for the plurality of UEs 115 based at least in part on the received channel state report, for example, in combination with the processor 402. The channel state module 408 may group at least the first UE 115 and a second UE 115 of the plurality of UEs 115 for MU-MIMO scheduling based at least in part on the received channel state report. The MU-MIMO scheduling may include a first PMI for the first UE 115, a first RI for the first UE 115, a first MCS for the first UE 115, a second PMI for the second UE 115, a second RI for the second UE 115, and/or a second MCS for the second UE 115 based on the channel state report.

In some aspects, the channel state module 408 may also be configured to trigger the first UE 115 to transmit the channel state report aperiodically. In some instances, the trigger may be based on a certain performance metric (e.g., a CQI, a target bit-error-rate (BER), a target block error rate (BLER), and/or a number of HARQ NACKs) failing to satisfy a certain threshold. Alternatively, the channel state module 408 may be configured to trigger the UE 115 to transmit the channel state report periodically. In some aspects, the channel state report may be a MAC layer message or MAC data payload received via MAC layer signaling (e.g., as data transported over PUSCH). In some instances, HARQ can be applied to PUSCH data to increase reliability as discussed above in relation to FIG. 1. The channel report configuration may also be transmitted via MAC signaling (e.g., in a MAC header), which may provide faster signaling than an RRC reconfiguration. Receiving the report through MAC signaling may reduce the load on the control channel (e.g., PUCCH), lowering the impact on the network's uplink throughout, and allow detailed reporting—with large-size CSF reports—including time and configuration stamps. For instance, each CSF report may include a timestamp indicating a time when the CSF report is generated or transmitted. Additionally or alternatively, each CSF report may include a configuration stamp indicating a report configuration used for generating the CSF report. As such, the time and configuration stamps may reduce errors caused by the configuration not being received because of a HARQ failure or the first UE 115 failing to transmit a CSF report. In general, the inclusion of a time and/or configuration stamp in a CSF report allows the channel state module 408 to interpret the CSF report correctly avoiding mismatch between a transmitted report configuration and a received report. In some aspects, the channel state module 408 may configure the first UE 115 to report CSF reports at a rate adapted to a data throughput and/or a traffic loading. In some aspects, the channel state module 408 may configure the first UE 115 to report CSF reports as part of a handover (HO)

procedure to assist the network in network optimization. For example, the channel state module 408 may report CSF reports based on an NZP-CSI-RS resource from a target BS of the HO while using the NZP-CSI-RS resource from the current BS as an interference source.

As another example (any or all aspects of which may be combined with the previous example), the channel state module may be configured to transmit (e.g., in combination with the transceiver 410) to a first UE of a plurality of UEs, a channel state report configuration indicating a set of one or more measurement resources and at least one of precoding information or rank indications associated with the set of one or more interference measurement resources. The channel state module 408 may also be configured to indicate (e.g., in the channel configuration report) a first PMI and a second PMI, and/or a first RI and a second RI. Effectively, the channel state module 408 may transmit any number of PMIs each corresponding to a UE 115 of the plurality of UEs, and any number of RIs for which the channel state module 408 desires information. The channel state module 408 may also be configured to transmit to the first UE 115 at different times over the time period, a plurality of first reference signals in a first channel response measurement resource different from the set of one or more measurement resources. The channel state module 408 may also be configured to transmit to the first UE 115 (e.g., in the channel configuration report) an indication of how many channel state feedbacks the first UE 115 should provide.

The channel state module 408 may also be configured to receive from the first UE 115, a channel state report including a plurality of expected CQIs over a time period based on the set of one or more measurement resources and the at least one of the precoding information or rank indications. The channel state report may be based on the plurality of first reference signals, and may include a first CQI for the first RI and a second CQI for the second RI (which may different than the first RI). The first CQI for the first RI and the second CQI for the second RI may be based on the set of interference measurement resources. The channel state report may also include a first MCS for the first RI and a second MCS for the second RI, the first MCS and second MCS being based on the set of interference measurement resources. The channel state report may also include a history of CQIs based on the set of measurement resources at a plurality of time instants. The channel state report may also include a history of channel state feedbacks—which may include the plurality of expected CQIs—based on the set of measurement resources and at least one of the precoding information or rank indications. Each channel state feedback may be associated with a timestamp.

The channel state module 408 may also be configured to determine a link adaptation (e.g., an OLLA) for the first UE 115 based at least in part on the channel state report. As part of determining the link adaptation, the channel state module 408 may be configured to determine an update for a PMI, RI, and/or MCS for communicating with the first UE 115.

As shown, the transceiver 410 may include the modem subsystem 412 and the RF unit 414. The transceiver 410 can be configured to communicate bi-directionally with other devices, such as the UEs 115 and/or 500 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., PDSCH signal, PDCCH signal, DL data, scheduling grants, RRC configurations, MAC messages, CSF configurations, reference signals, CSI-RSs, NZP-CSI-RSs, CSF report aperiodic triggers, precoding hypotheses (e.g., potential PMIs and/or codebook indices)) from the modem subsystem 412 (on outbound transmissions) or of transmissions originating from another source such as a UE 115 and/or UE 500. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 105 to enable the BS 105 to communicate with other devices.

The RF unit 414 may provide modulated and/or processed data, e.g. data packets (or, more generally, data messages that may contain one or more data packets and other information), to the antennas 416 for transmission to one or more other devices. The antennas 416 may further receive data messages transmitted from other devices and provide the received data messages for processing and/or demodulation at the transceiver 410. The transceiver 410 may provide the demodulated and decoded data (e.g., PUSCH signal, UL data, MAC messages, CSF reports, CQI reports, CQI history) to the channel state module 408 for processing. The antennas 416 may include multiple antennas of similar or different designs to sustain multiple transmission links.

In an example, the transceiver 410 is configured to transmit, to a first UE of a plurality of UEs, a channel state report configuration indicating a set of one or more interference measurement resources and precoding information associated with the set of one or more interference measurement resources. The transceiver 410 is also configured to receive, from the first UE, a channel state report including interference prediction information based on the set of one or more interference measurement resources and the precoding information. The processor 402 is configured to determine a group configuration for the plurality of UEs based at least in part on the received channel state report.

In another example, the transceiver 410 is configured to transmit to a first UE of a plurality of UEs, a channel state report configuration indicating a set of one or more measurement resources and at least one of precoding information or rank indications associated with the set of one or more interference measurement resources. The transceiver 410 is further configured to receive, from the first UE, a channel state report including a plurality of expected CQIs over a time period based on the set of one or more interference measurement resources and the at least one of the precoding information or rank indications, and the processor 402 is configured to determine a link adaptation for the first UE based at least in part on the received channel state report.

Figure 5:
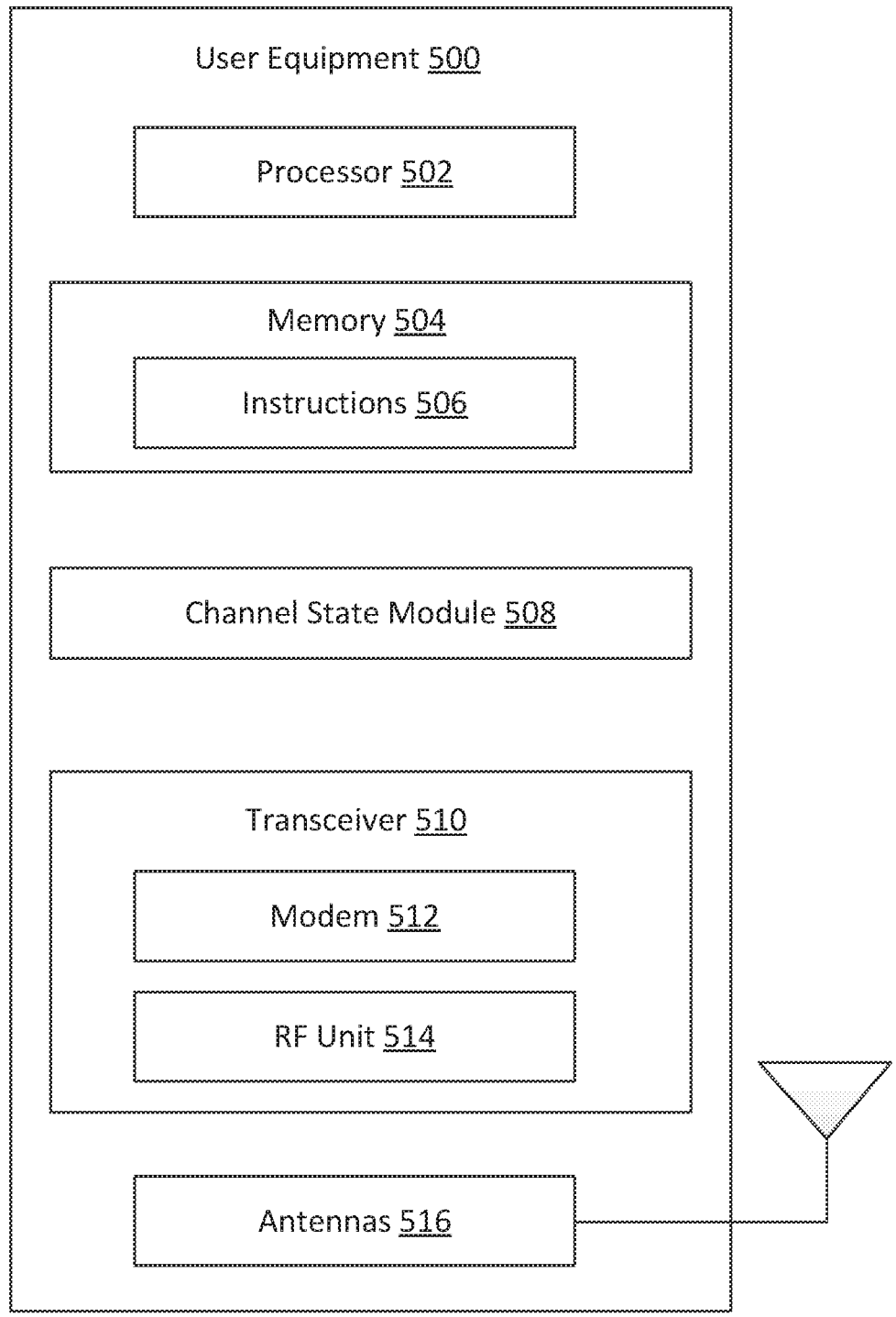
FIG. 5 is a block diagram of an exemplary user equipment (UE) according to some aspects of the present disclosure.

FIG. 5 is a block diagram of an exemplary UE 500 according to some aspects of the present disclosure. The UE 500 may be a UE 115 discussed above in FIG. 1. As shown, the UE 500 may include a processor 502, a memory 504, a channel state module 508, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 504 includes a non-transitory computer-readable medium. The memory 504 may store, or have recorded thereon, instructions 506. The instructions 506 may include instructions that, when executed by the processor 502, cause the processor 502 to perform the operations described herein with reference to the UEs 115 in connection with aspects of the present disclosure, for example, aspects of FIGS. 6-8, 10, and 12. Instructions 506 may also be referred to as program code, which may be interpreted broadly to include any type of computer-readable statement(s) as discussed above with respect to FIG. 4.

The channel state module 508 may be implemented via hardware, software, or combinations thereof. For example, the channel state module 508 may be implemented as a processor, circuit, and/or instructions 506 stored in the memory 504 and executed by the processor 502. In some examples, the channel state module 508 can be integrated within the modem subsystem 512. For example, the channel state module 508 can be implemented by a combination of software components (e.g., executed by a DSP or a general processor) and hardware components (e.g., logic gates and circuitry) within the modem subsystem 512.

The channel state module 508 may be used for various aspects of the present disclosure, for example, aspects of FIGS. 6-8, 10, and 12. For example, the channel state module 508 may be configured to receive (e.g., through MAC signaling, in combination with the transceiver 510), from a BS 105, a channel state report configuration indicating a set of one or more interference measurement resources and precoding information associated with the set of one or more interference measurement resources. The channel state report configuration may also indicate a PMI for each resource of the set of one or more interference measurement resources. As part of receiving the channel state report, the channel state module 508 may also a receive, from the BS 105, a PMI associated with the UE 500 and the precoding information may include a second PMI associated with a first interference measurement resource of the set of interference measurement resources. The channel state module 508 may also be configured to receive, from the BS, a first reference signal (e.g., an NZP-CSI-RS) in a channel measurement resource different from the set of one or more interference measurement resources. Based on the first reference signal, the channel state module 508 may determine a channel response. The channel state module 508 may also be configured to determine the interference prediction information based on the set of interference measurement resources, the precoding information, and/or the determined channel response (e.g., as discussed more fully below in relation to FIGS. 6 and 7). In some aspects, the channel state module 508 may be configured to determine the interference prediction information in accordance with equation (1) discussed below.

The channel state module 508 may also be configured to transmit (e.g., through MAC signaling, in combination with the transceiver 510), to the BS 105, a channel state report including interference prediction information based on the set of interference measurement resources and the precoding information. The report may indicate an RI, a PMI, and/or an expected CQI associated with the UE 500 based on a first predicted interference associated with a first interference measurement resource of the set of interference measurement resources and a corresponding first PMI. The channel state module 508 may also be configured to select the first interference measurement resource from among the set of interference measurement resources based on the first predicted interference associated with the first interference measurement resource and the first PMI having a lesser amount of interference to the UE 500 than a second predicted interference associated with a second interference measurement resource of the set of interference measurement resources and a corresponding second PMI. The report may also indicate that the first predicted interference associated with the first interference measurement resource and the corresponding first PMI among the set of interference measurement resources and corresponding PMIs provides a least amount of interference to the UE 500. The report may also indicate an RI or an expected CQI associated with the UE 500 based on a predicted interference associated with the first interference measurement resource and the second PMI. In some aspects, the channel state report may be time-stamped.

The channel state module 508 may also be configured to receive scheduling information (e.g., determined by the BS 105) based on the channel state report (e.g., in combination with the transceiver 510). The scheduling information may include a PMI, an RI, and/or an MCS.

In another example, the channel state module 508 may be configured to receive, from a BS 105, a channel state report configuration indicating a set of one or more interference measurement resources and precoding information associated with the set of one or more interference measurement resources. The channel state module 508 may also be configured to receive an indication of a first RI and a second RI and/or a first PMI and a second PMI for which the BS 105 desires feedback. The channel state module 508 may also be configured to receive an indication of a quantity of channel state feedbacks the channel state module 508 is to transmit to the BS as part of a history of channel feedbacks.

The channel state module 508 may also be configured to transmit, to the BS, a channel state report including a plurality of expected CQIs over a time period based on a set of measurement resources and at least one of precoding information or rank indications associated with the set of one or more measurement resources. The report may include a first CQI for the first RI and a second CQI for the second RI (where the first and second RIs are different), based on the set of measurement resources. The report may also include a first CQI for a first PMI and a second CQI for a second PMI (where the first and second PMIs are different), based on the set of measurement resources. The report may also include a first MCS for the first RI and a second MCS for the second RI, based on the set of measurement resources. The report may also include a history of CQIs based on the set of measurement resources at a plurality of time instants. The report may also include the history of channel state feedbacks including the plurality of expected CQIs based on the set of measurement resources and the precoding information. Further, each channel state feedback may be associated with a timestamp.

The channel state module 508 may also be configured to receive, from the BS 105, scheduling information including a PMI, RI, and/or MCS based on the received channel state report.

As shown, the transceiver 510 may include a modem subsystem 512 and an RF unit 514. The transceiver 510 can be configured to communicate bi-directionally with other devices, such as the BSs 105. The modem subsystem 512 may be configured to modulate and/or encode the data from the memory 504 and/or the channel state module 508 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., PUSCH signal, UL data, CSF reports, CQI reports, CQI history) from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices.

The RF unit 514 may provide modulated and/or processed data, e.g. data packets (or, more generally, data messages that may contain one or more data packets and other information), to the antennas 516 for transmission to one or more other devices. The antennas 516 may further receive data messages transmitted from other devices. The antennas 516 may provide the received data messages for processing and/or demodulation at the transceiver 510. The transceiver 510 may provide the demodulated and decoded data (e.g., PDSCH signal, PDCCH signal, DL data, scheduling grants, RRC configurations, MAC messages, CSF configurations, reference signals, CSI-RSs, NZP-CSI-RSs, CSF report aperiodic triggers, precoding hypotheses (e.g., potential PMIs and/or codebook indices)) to the channel state module 508 for processing. The antennas 516 may include multiple antennas of similar or different designs in order to sustain multiple transmission links. The RF unit 514 may configure the antennas 516.

In an aspect, the UE 500 can include multiple transceivers 510 implementing different RATs (e.g., NR and LTE). In an aspect, the UE 500 can include a single transceiver 510 implementing multiple RATs (e.g., NR and LTE). In an aspect, the transceiver 510 can include various components, where different combinations of components can implement different RATs.

In an example, the transceiver 510 is configured to receive, from a BS, a channel state report configuration indicating a set of one or more interference measurement resources and precoding information associated with the set of one or more interference measurement resources, and to transmit, to the BS, a channel state report including interference prediction information based on the set of one or more interference measurement resources and the precoding information. The transceiver 510 may coordinate with other components of the UE 500, for example, the processor 402 and the channel state module 508.

In another example, the transceiver 510 is configured to receive from a BS, a channel state report configuration indicating a set of one or more measurement resources and at least one of precoding information or rank indications associated with the set of one or more measurement resources associated with the set of one or more interference measurement resources. The transceiver is further configured to transmit, to the BS, a channel state report including a plurality of expected CQIs over a time period based on the set of one or more measurement resources and the at least one of precoding information or rank indications associated with the set of one or more measurement resources.

Figure 6:
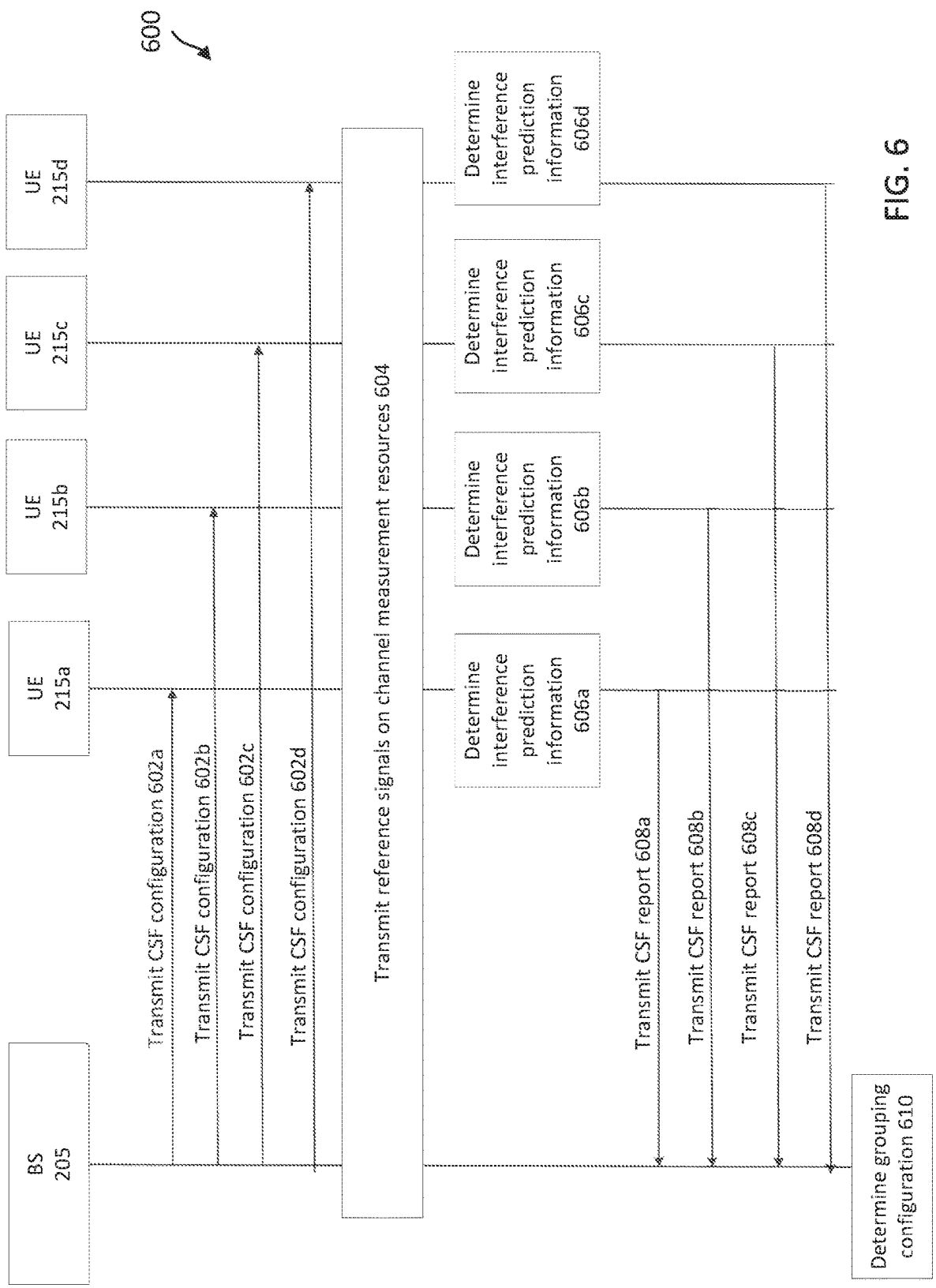
FIG. 6 is an exemplary sequence diagram illustrating a communication sequence according to some aspects of the present disclosure.
Figure 7:
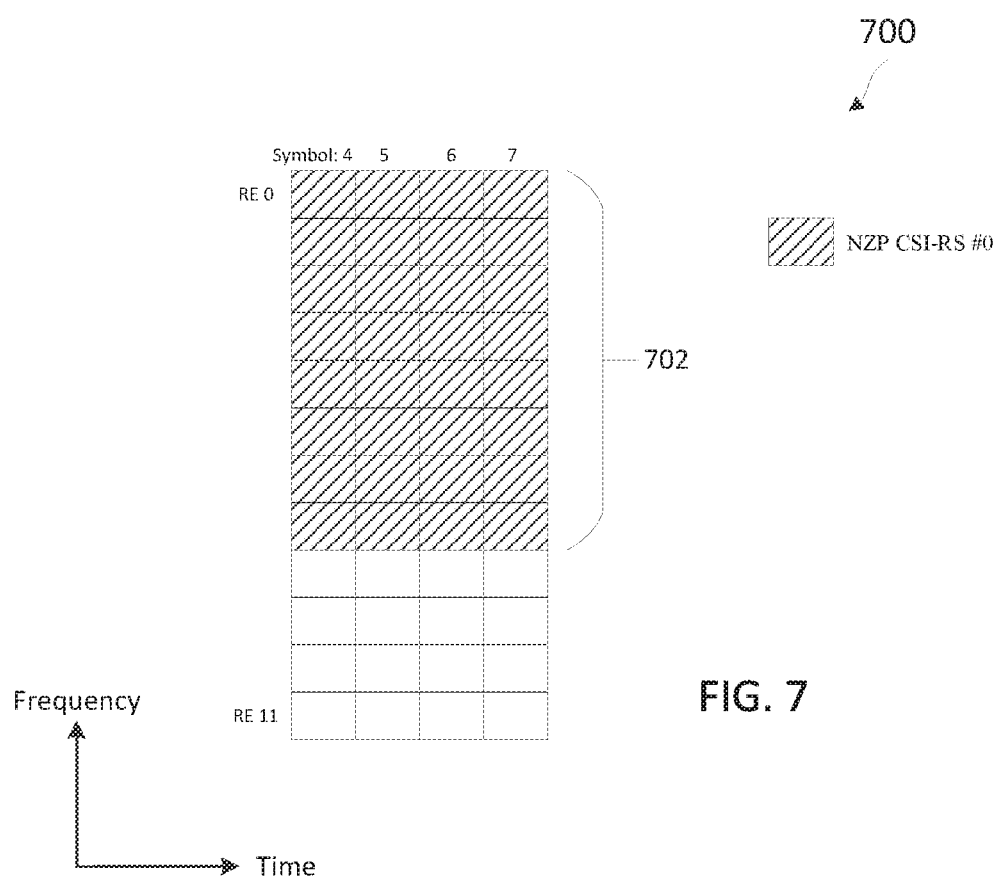
FIG. 7 illustrates an exemplary NZP-CSI-RS resource allocation and transmission scheme for MU-MIMO according to some aspects of the present disclosure.

FIG. 6 is discussed in relation to FIG. 7 to illustrate interference prediction-based channel state feedback. FIG. 6 is an exemplary sequence diagram illustrating a communication sequence 600 according to some aspects of the present disclosure. The sequence 600 may be performed by a BS 205 (which may be a BS 105 or 400) requesting channel estimation and interference measurements and a number of UEs 215a-215d (which may be UEs 115 or 500) from which channel estimation and interference measurements are requested, in order to partition the set of UEs 215 into groups for parallel MU-MIMO communication. For simplicity, one BS 205 and four UEs 215 are shown, though any number of UEs 215 may be considered.

At steps 602a-602d, BS 205 transmits to the UEs 215 various CSF configurations (also referred to as channel report configurations herein), as described in detail below. The CSF configuration may indicate one of various reporting modes as will be discussed more fully below.

For instance, at step 602a, BS 205 transmits a CSF configuration to UE 215a. The CSF configuration may provide UE 215a with details on hypothetical or potential groupings of UEs 215a for which BS 205 is requesting interference measurement information, as well as indications about what kinds of information BS 205 is requesting in the corresponding CSF report. For example, the CSF configuration may include a list of potential or hypothetical precodings (e.g., a PMI or codebook index) that the UE 215a may use for estimating interference from UEs 215b-215d. For example, the list may include a PMI corresponding to UE 215b, a PMI corresponding to UE 215c, and a PMI corresponding to UE 215d. In some examples, aspects of the step 602a may be performed by a channel state module 408 as described with reference to FIG. 4.

At step 602b, BS 205 transmits a CSF configuration to UE 215b (e.g., through MAC signaling). The CSF configuration may provide UE 215b with details on hypothetical or potential groupings of UEs 215 for which BS 205 is requesting interference measurement information, as well as indications about what kinds of information BS 205 is requesting in the corresponding CSF report. For example, the CSF configuration may include a list of potential or hypothetical precodings (e.g., a PMI or codebook index) that the UE 215b may use for estimating interference from UEs 215a and 215c-215d. For example, the list may include a PMI corresponding to UE 215a, a PMI corresponding to UE 215c, and a PMI corresponding to UE 215d. In some examples, aspects of the step 602b may be performed by a channel state module 408 as described with reference to FIG. 4.

At step 602c, BS 205 transmits a CSF configuration to UE 215c (e.g., through MAC signaling). The CSF configuration may provide UE 215c with details on hypothetical or potential groupings of UEs 215 for which BS 205 is requesting interference measurement information, as well as indications about what kinds of information BS 205 is requesting in the corresponding CSF report. For example, the CSF configuration may include a list of potential or hypothetical precodings (e.g., a PMI or codebook index) that the UE 215c may use for estimating interference from UEs 215a, 215b, and 215d. For example, the list may include a PMI corresponding to UE 215a, a PMI corresponding to UE 215b, and a PMI corresponding to UE 215d. In some examples, aspects of the step 602c may be performed by a channel state module 408 as described with reference to FIG. 4.

At step 602d, BS 205 transmits a CSF configuration to UE 215d (e.g., through MAC signaling). The CSF configuration may provide UE 215d with details on hypothetical or potential groupings of UEs 215 for which BS 205 is requesting interference measurement information, as well as indications about what kinds of information BS 205 is requesting in the corresponding CSF report. For example, the CSF configuration may include a list of potential or hypothetical precodings (e.g., a PMI or codebook index) that the UE 215d may use for estimating interference from UEs 215a-215c. For example, the list may include a PMI corresponding to UE 215a, a PMI corresponding to UE 215b, and a PMI corresponding to UE 215c. In some examples, aspects of the step 602d may be performed by a channel state module 408 as described with reference to FIG. 4.

At step 604, the BS 205 may transmit reference signals on channel measurement resources to each of the UEs 215, using, for example, the scheme 700 as discussed in detail in the description of FIG. 7. The reference signals may be NZP-CSI-RSs including pilot signals (e.g., without precoding) for channel response estimation. In some examples, aspects of the step 604 may be performed by a channel state module 408 as described with reference to FIG. 4.

At step 606a, the UE 215a determines interference prediction information using the NZP-CSI-RS transmitted at step 604 and the CSF configuration transmitted at step 602a. The UE 215a may use the same NZP-CSI-RS both for channel estimation, and for reconstructing the interfering streams and determining predicted interference from UEs 215b-215d based on the precoding information for each of UEs 215b-215d in the CSF report, for example, in accordance with equation (1) below. In some examples, aspects of the step 606a may be performed by a channel state module 508 as described with reference to FIG. 5.

At step 606b, the UE 215b determines interference prediction information using the NZP-CSI-RS transmitted at step 604 and the CSF configuration transmitted at step 602b. The UE 215b may use the same NZP-CSI-RS both for channel estimation, and for reconstructing the interfering streams and determining predicted interference from UEs 215a and 215c-215d based on the precoding information for each of UEs 215a and 215c-215d in the CSF report. In some examples, aspects of the step 606b may be performed by a channel state module 508 as described with reference to FIG. 5.

At step 606c, the UE 215c determines interference prediction information using the NZP-CSI-RS transmitted at step 604 and the CSF configuration transmitted at step 602c. The UE 215c may use the same NZP-CSI-RS both for channel estimation, and for reconstructing the interfering streams and determining predicted interference from UEs 215a-215b and 215d based on the precoding information for each of UEs 215a-215b and 215d in the CSF report. In some examples, aspects of the step 606c may be performed by a channel state module 508 as described with reference to FIG. 5.

At step 606d, the UE 215d determines interference prediction information using the NZP-CSI-RS transmitted at step 604 and the CSF configuration transmitted at step 602d. The UE 215d may use the same NZP-CSI-RS both for channel estimation, and for reconstructing the interfering streams and determining predicted interference from UEs 215a-215c based on the precoding information for each of UEs 215a-215c in the CSF report. In some examples, aspects of the step 606d may be performed by a channel state module 508 as described with reference to FIG. 5.

At steps 608a-608d, the UEs 215a-215d each transmit CSF reports (e.g., through MAC signaling) based on the channel response estimation and interference prediction information they determined in steps 606a-606d. In some examples, aspects of the steps 608a-608d may be performed by a channel state module 508 as described with reference to FIG. 5.

At step 610, BS 205 determines a grouping configuration (i.e., how to partition the UEs 215 into groups for parallel MU-MIMO communications) based on the CSF reports transmitted by the UEs 215 at steps 608a-608d. In some examples, aspects of the step 610 may be performed by a channel state module 408 as described with reference to FIG. 4.

FIG. 7 illustrates an exemplary NZP-CSI-RS resource allocation and transmission scheme 700 for MU-MIMO according to some aspects of the present disclosure. The scheme 700 may be employed, for example, by a BS 105, 205, or 400 requesting channel estimation and interference measurements from a UE 115, 215, or 500 in order to partition a set of UEs 215 into groups for parallel MU-MIMO communication. In FIG. 7, the x-axis may represent time in some arbitrary units, and the y-axis may represent frequency in some arbitrary units.

For simplicity, the scheme 700 is illustrated using one BS 205 and four UEs 215 (e.g., UEs 215a-215d), though any number of UEs 215 may be considered. The BS 205 may transmit an NZP-CSI-RS 702 to UE 205a. In contrast to the scheme 300, the same NZP-CSI-RS 702 may be used for both channel estimation and interference measurement. For example, the NZP-CSI-RS 702 may include pilots (e.g., without precoding) for UE 205a to perform channel estimation. The BS 205 may provide information to UE 215a to allow UE 215a to reconstruct interfering streams using the single NZP-CSI-RS 702 to account for potential interference from UEs 215b-215d being considered for scheduling in parallel, as discussed in detail with respect to FIG. 6. The information may include, for example, a list of potential or hypothetical precodings (e.g., a PMI or codebook index) that the UE 215a may use for estimating interference from UEs 215b-215d. For example, the list may include a PMI corresponding to UE 215b, a PMI corresponding to UE 215c, and a PMI corresponding to UE 215d. The UE 215a may use the precodings in the list to estimate the interference caused by UEs 215b-215d based on the channel response estimation (determined by UE 215a using NZP-CSI-RS 702) and the precoding corresponding to each of UEs 215b-215d.

As an example, the BS 205 may have 32 transmit antenna ports and the UE 215 may have 4 receive antenna ports. The NZP-CSI-RS 702 may include 32 pilots (shown by each patterned filled box), each transmitted via one of the 32 antenna ports. Similar to the examples discussed in relation to FIGS. 2 and 3, the BS 205 may consider grouping one or more of the UEs 215 for MU-MIMO. To enable the UE 215a to estimate or predict interference from the other UEs 215b-215d, the BS 205 may provide the UE 215a with potential precodings to be used for the UE 215b-215d. For instance, the potential precoding can be represented by a precoding matrix, denoted as $W_{32 \times L}$, where L may represent the number of interference (e.g., L=3 for UEs 215b-d). Upon receiving the NZP-CS-RS 702, the UE 215 may determine a channel response, denoted as a 4-by-32 channel matrix $H_{4 \times 32}$, from the NZP-CS-RS 702. After determining the channel response $H_{4 \times 32}$ between the UE 215a and the BS 205, the UE 215 may determine or predict interference from the UEs 215b-215d based on the channel response $H_{4\times32}$ and the precodings $W_{32\times L}$. For example, the predicted interference may be computed in accordance with equation (1) below:

$$H_{int}=[h_{int,0},h_{int,1},h_{int,L,int-1}]=H_{4\times32}WH_{32\times L}, \quad (1)$$

where $H_{int}$ may represent the predicted interference from the UEs 215b-215d. For example, $h_{int,0}$, $h_{int,1}$, $h_{int2}$ may represent predicted interference from the UEs 215b, 215c, and 215d, respectively.

Based on the channel estimation and interference estimates, UE 215a may prepare and transmit a channel state feedback to report BS 205 indicating a selected NZP-CSI-RS resource configuration and/or corresponding precoding that may create the least amount of interference at the UE 215a. The BS may repeat the process for each of UEs 215b-215d, as described in FIG. 6.

In some aspects, a CSF report configuration may indicate a reporting mode, such as a CRI-RI-PMI-CQI mode, a CRI-RI-L1 mode, and/or a CRI-RI-CQI mode. For example, in CRI-RI-PMI-CQI mode, the resulting CSF report may include the best RI and PMI for a particular CRI (e.g., indicating a resource where CSI-RS is transmitted) and a corresponding expected CQI from the RI and PMI. In some instances, the BS 205 may use the CRI-RI-PMI-CQI mode to collect predicted interference information from the UEs 215a, 215b, 215c, and/or 215d to determine a best grouping for the UEs 215-UE 215d. After the BS 205 has determined some potential groupings, for example, to group UEs 215a and 215b for MU-MIMO, the BS 205 may use the CRI-RI-CQI mode. For instance, the BS 205 may transmit a precoded data stream (e.g., precoded according to a PMI selected for the UE 215a) and provide the UE 215a with a PMI selected for the UE 215b and request the UE 215a to report in a CRI-RI-CQI mode. In the CRI-RI-CQI mode, the resulting CSF report may include a best RI for the UE 215a determined based on the precoded data stream and interference predicted based on the provided PMI (for the UE 215b) and a corresponding expected CQI. In CRI-RI-L1 mode, the resulting CSF report may include the best directional beam (e.g., via an RI indication and/or a beam index) for communication between a UE 215 and the BS 205 and a corresponding layer 1-reference signal received power (L1-RSRP) measurement from the beam.

Figure 8:
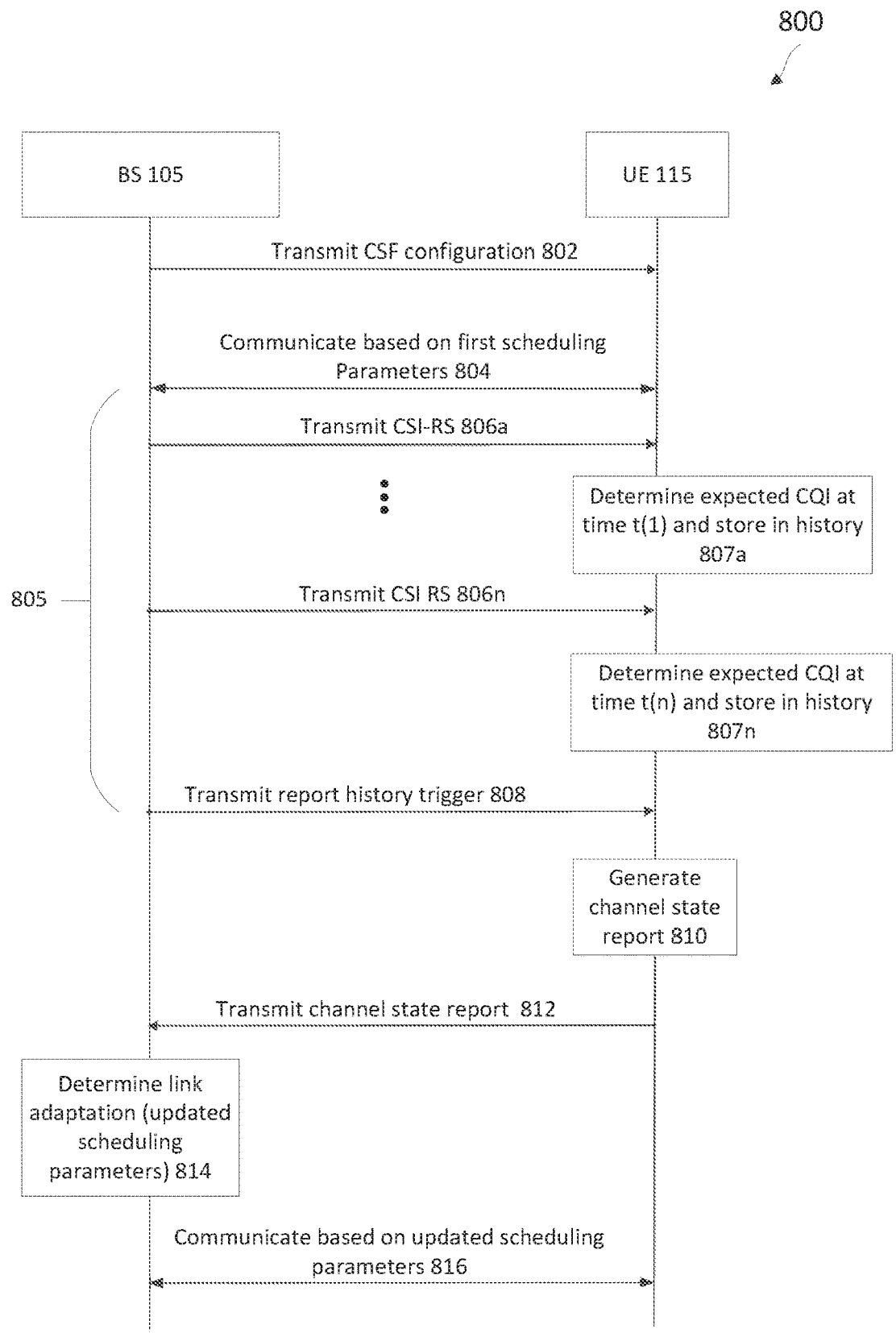
FIG. 8 is an exemplary sequence diagram illustrating a communication sequence according to some aspects of the present disclosure.

FIG. 8 an exemplary sequence diagram illustrating a communication sequence 800 according to some aspects of the present disclosure. The sequence 800 may be performed by a BS 105 (which may be a BS 205 or 400) and a UE (which may be a UE 215 or 500). For simplicity, the one BS 105 and one UE 115 are shown, though other combinations of BSs 105 and UEs 115 may are possible.

At step 802, the BS 105 transmits a channel report configuration (also referred to herein as a CSF configuration), using, for example, MAC signaling, to UE 115. The CSF configuration may indicate a set of interference measurement resources and precoding information associated with the set of interference measurement resources. The CSF configuration may also include a list of RIs and/or a list of PMIs for MCS calculation, and/or a quantity of expected channel state feedbacks (e.g., last N number of channel state feedbacks) to be included in the report, as described in FIG. 4. In some examples, aspects of the step 802 may be performed by a channel state module 408 as described with reference to FIG. 4.

At step 804, BS 105 and UE 115 communicate based on scheduling parameters. In some examples, aspects of the step 804 may be performed by a channel state module 508 as described with reference to FIG. 5.

During time period 805, BS 105 may transmit a number of CSI-RSs (e.g., the CSI-RSs 702) to UE 115, and UE 115 may determine an expected CQI based on the CSI-RSs and the CSF configuration. For instance, the UE 115 may determine a channel response from the CSI-RSs and determine predicted interference from the channel response and the precoding information in accordance with equation (1) described above. The UE 115 may compute an expected CQI based on the predicted interference and the channel response (e.g., based on SNR estimate).

For example, at step 806a, the BS 105 transmits a CSI-RS to UE 115. In some examples, aspects of the step 806a may be performed by a channel state module 408 as described with reference to FIG. 4.

At step 807a, the UE 115 determines an expected CQI at that time, t(1), based on the CSI-RS and predicted interference (e.g., predicted based on precoding information in the CSF configuration) using mechanisms discussed above and stores it in a history (e.g., using memory 504). Multiple CSI-RSs are transmitted and multiple expected CQIs are determined and stored in history, through time t(n). In some aspects, the UE 115 may determine a CQI or a MCS for each PMI in the list of PMIs. In some aspects, the UE 115 may determine a CQI or a MCS for each RI in the list of RIs. In some examples, aspects of the step 807a may be performed by a channel state module 508 as described with reference to FIG. 5.

At step 806n, the BS 105 transmits a last CSI-RS of time period 805. In some examples, aspects of the step 806n may be performed by a channel state module 408 as described with reference to FIG. 4.

At step 807n, the UE 115 determines the expected CQI at time t(n) and stores the CQI in history. In some examples, aspects of the step 807n may be performed by a channel state module 508 as described with reference to FIG. 5.

At step 808, the BS transmits a report history trigger to the UE 115, prompting the UE to prepare and transit a channel state report (e.g., a CSF report). In some examples, aspects of the step 808 may be performed by a channel state module 408 as described with reference to FIG. 4.

At step 810, the UE 115 generates the CSF report, which may include the expected CQIs determined during time period 805, recommended MCSs for different RIs and/or different PMIs indicated in the CSF configuration, and a history of channel state feedbacks. In some instances, the UE 115 may generate the CSF report based on a report mode (e.g., a history CQI reporting mode, a list report mode, and/or a history CSF report) indicated in the report configuration. For the history CQI reporting mode, the CSF report may include a last CQI report (e.g., most recent computed expected CQI). For the list report mode, the CSF report may include a list of CQI, for example, one CQI for each RI in a list of RIs provided by the report configuration. Alternatively or additionally, the CSF report may include a list of CQI, for example, one CQI for each PMI in a list of PMIs provided by the report configuration. For the history CSF report, the CSF report may include the last N CSF reports (e.g., the value N may be provided by the report configuration). In some instances, the CSF report may include a history of CQIs for certain CRI-PMI-RI combinations (e.g., an extension of codebook restriction). For example, the BS may send for each requested report a list of valid PMIs based on previous reports. In some examples, aspects of the step 810 may be performed by a channel state module 508 as described with reference to FIG. 5.

At step 812, UE 115 transmits the CSF report to BS 115 (e.g., using MAC signaling). In some examples, aspects of the step 812 may be performed by a channel state module 508 as described with reference to FIG. 5.

At step 814, the BS 105 performs link adaption (e.g., OLLA) based at least in part on the CSF report. The BS 105 may update a PMI, RI, and/or MCS for the link with UE 115 during the link adaptation process, based on the data transmitted on the CSF report. For example, if the CQI is improved (e.g., higher CQIs than a previous report period), the BS 105 may select a higher MCS level. Conversely, if the CQI is degraded (e.g., lower CQIs than a previous report period), the BS 105 may select a lower MCS level. The BS may also change the RI (e.g., utilizing a different number of spatial layers) and/or PMI to provide an optimal performance for the UE 115. In some instances, the BS 105 may analyze the CQI history per RI or per PMI to determine a channel variation. In some instances, if the link is undergoing jitter at the time BS 105 performs link adaptation, the BS may rely on older CQIs transmitted as part of the feedback history to determine more accurate PMI, RI, and/or MCS values for the link. In some examples, aspects of the step 814 may be performed by a channel state module 408 as described with reference to FIG. 4.

Figure 9:
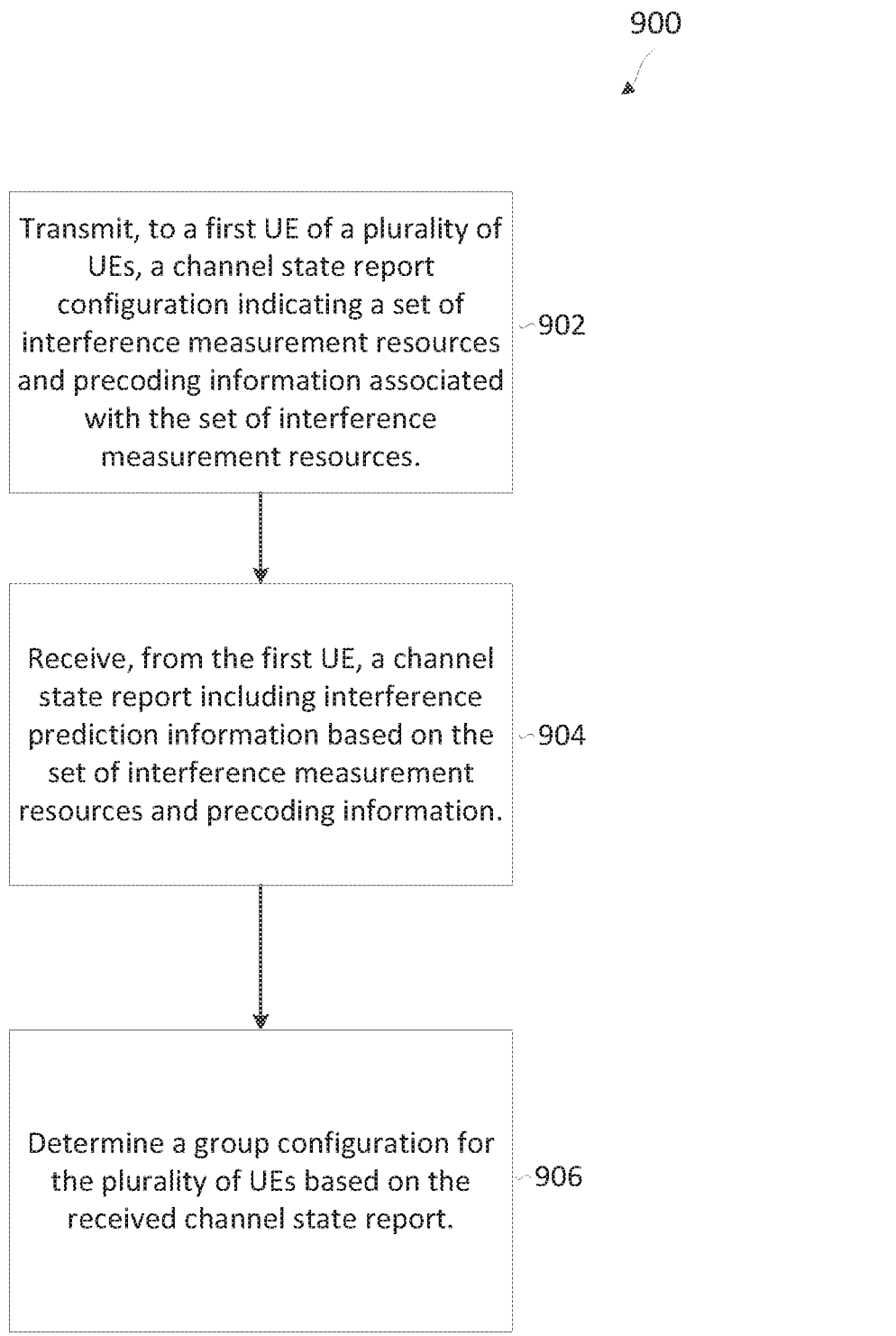
FIG. 9 is a flow diagram of wireless communication according to some aspects of the present disclosure.

FIG. 9 is a flow diagram of wireless communication method 900 according to some aspects of the present disclosure. Aspects of the method 900 can be executed by a computing device (e.g., a processor, processing circuit, and/or other suitable component) of a wireless communication device or other suitable means for performing the steps. For example, a wireless communication device, such as the BS 105, 205, or 400, may utilize one or more components, such as the processor 402, the memory 404, the channel state module 408, the transceiver 410, the modem 412, and the one or more antennas 416, to execute the steps of method 900. The method 900 may employ similar mechanisms as in the sequence 600, the scheme 700, and the sequence 800 as described above with respect to FIGS. 6-8. As illustrated, the method 900 includes several enumerated steps, but aspects of the method 900 may include additional steps before, after, and in between the enumerated steps. In some aspects, one or more of the enumerated steps may be omitted or performed in a different order.

At block 902, the BS 105 may transmit a channel state report configuration to a first UE 115 of a plurality of UEs 115. In some instances, the BS 105 may utilize one or more components, such as the processor 402, the memory 404, the channel state module 408, the transceiver 410, and the modem 412 to perform aspects of the block 902.

In some aspects, the channel state report configuration may be transmitted through media access control (MAC) signaling, and may indicate a set of one or more interference measurement resources and precoding information associated with the interference measurement resources. The channel state report configuration may indicate a PMI for each resource of the set of interference measurement resources. As part of transmitting the channel state report configuration, the BS may also transmit a PMI associated with the first UE 115. The precoding information may include a second PMI associated with a first interference measurement resource of the set of interference measurement resources. In some instances, the BS 105 may transmit a reference signal (e.g., an NZP-CSI-RS) to the first UE 115 for the first UE 115 to perform channel response estimation and interference measurement to determine mutual interference between the first UE 115 and other UEs 115 in the plurality of UEs 115. The reference signal may be transmitted in a channel response measurement resource different than those in the set of interference measurement resources. In some instances, the BS 105 may also refrain from transmitting a second reference signal in the set of interference measurement resources.

At block 904, the BS 105 may receive a channel state report (e.g., over MAC signaling) including interference prediction information based on the set of one or more interference measurement resources and the precoding information from the first UE 115. In some instances, the BS 105 may utilize one or more components, such as the processor 402, the memory 404, the channel state module 408, the transceiver 410, and the modem 412 to perform aspects of the block 904.

In some aspects, the channel state report may be based on the first reference signal and may include interference prediction information, including a rank indicator (RI), a precoding matrix indicator (PMI), and/or an expected channel quality indicator (CQI) associated with the first UE 115 based on a first predicted interference associated with a first interference measurement resource of the set of interference measurement resources and a corresponding first PMI. The channel state report may indicate that the first predicted interference associated with the first interference measurement resource and the corresponding first PMI among the set of one or more interference measurement resources and corresponding PMIs provides a least amount of interference to the first UE. The channel state report may also include an RI and/or an expected CQI associated with the first UE based on predicted interference associated with the first interference measurement resource and the second PMI. In some instances, the channel state report may be time-stamped.

At block 906, the BS may determine a group configuration for the plurality of UEs 115 based at least in part on the received channel state report. In some instances, the BS 105 may utilize one or more components, such as the processor 402, the memory 404, the channel state module 408, the transceiver 410, and the modem 412 to perform aspects of the block 906.

In some aspects, the BS may group at least the first UE 115 and a second UE 115 of the plurality of UEs 115 for MU-MIMO scheduling based at least in part on the received channel state report. The MU-MIMO scheduling may include a first PMI for the first UE 115, a first RI for the first UE 115, a first MCS for the first UE 115, a second PMI for the second UE 115, a second RI for the second UE 115, and/or a second MCS for the second UE based on the channel state report.

Figure 10:
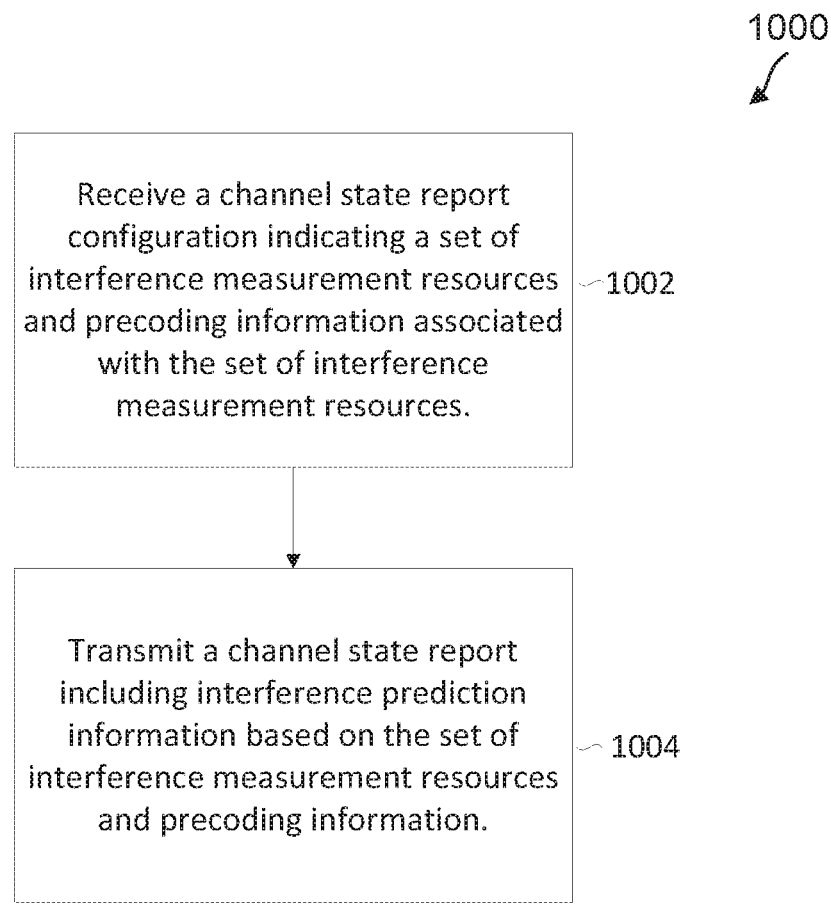
FIG. 10 is a flow diagram of wireless communication according to some aspects of the present disclosure.

FIG. 10 is a flow diagram of wireless communication method 1000 according to some aspects of the present disclosure. Aspects of the method 1000 can be executed by a computing device (e.g., a processor, processing circuit, and/or other suitable component) of a wireless communication device or other suitable means for performing the steps. For example, a wireless communication device, such as a UE 115, 215, or 500, may utilize one or more components, such as the processor 502, the memory 504, the channel state module 508, the transceiver 510, the modem 512, and the one or more antennas 516, to execute the steps of method 1000. The method 1000 may employ similar mechanisms as in the sequence 600, the scheme 700, and the sequence 800 described above with respect to FIGS. 6-8. As illustrated, the method 1000 includes several enumerated steps, but aspects of the method 1000 may include additional steps before, after, and in between the enumerated steps. In some aspects, one or more of the enumerated steps may be omitted or performed in a different order.

At block 1002, the UE 115 may receive (e.g., through MAC signaling), from a BS 105, a channel state report configuration indicating a set of one or more interference measurement resources and precoding information associated with the set of one or more interference measurement resources. In some instances, the UE 115 may utilize one or more components, such as the processor 502, the memory 504, the channel state module 508, the transceiver 510, and the modem 512 to perform aspects of the block 1002.

In some aspects, the channel state report configuration may also indicate a PMI for each resource of the set of one or more interference measurement resources. As part of receiving the channel state report, the UE 115 may also a receive, from the BS 105, a PMI associated with the UE 115 and the precoding information may include a second PMI associated with a first interference measurement resource of the set of interference measurement resources. The channel state module may also be configured to receive, from the BS 105, a first reference signal (e.g., an NZP-CSI-RS) in a channel measurement resource different from the set of one or more interference measurement resources. Based on the first reference signal, the UE 115 may determine a channel response. The UE 115 may also determine the interference prediction information based on the set of interference measurement resources, the precoding information, and/or the determined channel response.

At block 1004, the UE 115 may transmit (e.g., through MAC signaling), to the BS 105, a channel state report including interference prediction information based on the set of interference measurement resources and the precoding information. In some instances, the UE 115 may utilize one or more components, such as the processor 502, the memory 504, the channel state module 508, the transceiver 510, and the modem 512 to perform aspects of the block 1004.

In some aspects, the report may indicate an RI, a PMI, and/or an expected CQI associated with the UE 115 based on a first predicted interference associated with a first interference measurement resource of the set of one or more interference measurement resources and a corresponding first PMI. The UE 115 may also be configured to select the first interference measurement resource from among the set of interference measurement resources based on the first predicted interference associated with the first interference measurement resource and the first PMI having a lesser amount of interference to the UE 115 than a second predicted interference associated with a second interference measurement resource of the set of one or more interference measurement resources and a corresponding second PMI. The report may indicate that the first predicted interference associated with the first interference measurement resource and the corresponding first PMI among the set of interference measurement resources and corresponding PMIs provides a least amount of interference to the UE 115. The report may also indicate an RI or an expected CQI associated with the UE 115 based on a predicted interference associated with the first interference measurement resource and the second PMI. In some aspects, the channel state report may be timestamped.

In some aspects, the UE 115 may also receive scheduling information (e.g., determined by the BS 105) based on the channel state report. The scheduling information may include a PMI, an RI, and/or an MCS.

Figure 11:
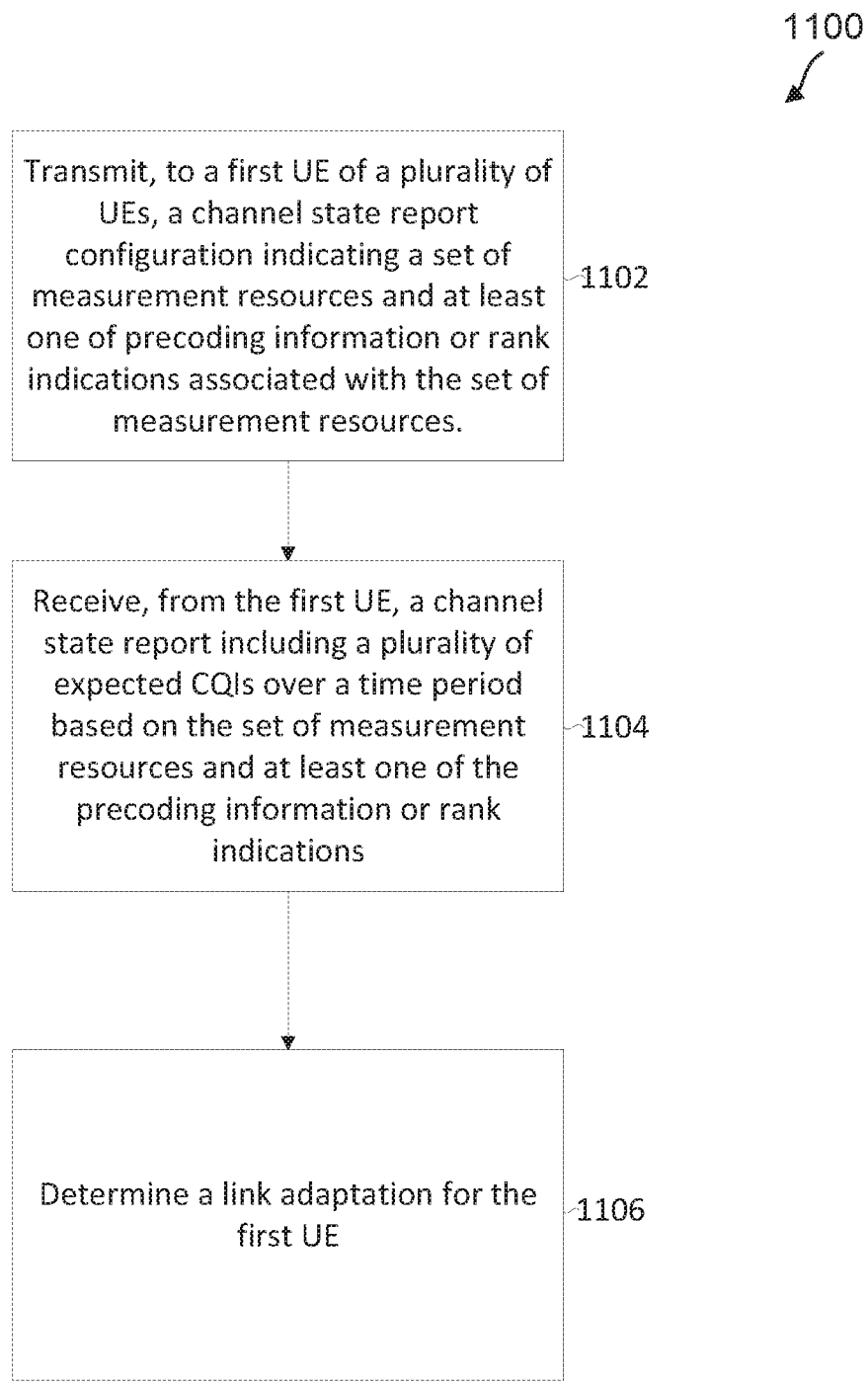
FIG. 11 is a flow diagram of wireless communication according to some aspects of the present disclosure.

FIG. 11 is a flow diagram of wireless communication method 1100 according to some aspects of the present disclosure. Aspects of the method 1100 can be executed by a computing device (e.g., a processor, processing circuit, and/or other suitable component) of a wireless communication device or other suitable means for performing the steps. For example, a wireless communication device, such as the BS 105, 205, or 400, may utilize one or more components, such as the processor 402, the memory 404, the channel state module 408, the transceiver 410, the modem 412, and the one or more antennas 416, to execute the steps of method 900. The method 900 may employ similar mechanisms as in the sequence 600, the scheme 700, and the sequence 800 described above with respect to FIGS. 6-8. As illustrated, the method 1100 includes several enumerated steps, but aspects of the method 1100 may include additional steps before, after, and in between the enumerated steps. In some aspects, one or more of the enumerated steps may be omitted or performed in a different order.

At block 1102, a BS 105 may transmit to a first UE 115 of a plurality of UEs 115, a channel state report configuration (e.g., through MAC signaling) indicating a set of one or more measurement resources and at least one of precoding information or rank indications associated with the set of one or more measurement resources. In some instances, the BS 105 may utilize one or more components, such as the processor 402, the memory 404, the channel state module 408, the transceiver 410, and the modem 412 to perform aspects of the block 1102.

In some aspects, the BS 105 may also indicate a first PMI and a second PMI, and/or a first RI and a second RI. The BS 105 may also transmit to the first UE 115 at different times over the time period, a plurality of first reference signals in a first channel response measurement resource different from the set of one or more measurement resources. The BS 105 may also transmit to the first UE 115 (e.g., in the channel configuration report) an indication of how many channel state feedbacks the first UE 115 should provide.

At block 1104, the BS 105 may receive from the first UE 115, a channel state report including a plurality of expected CQIs over a time period based on the set of one or more measurement resources and the at least one of precoding information or rank indications. In some instances, the BS 105 may utilize one or more components, such as the processor 402, the memory 404, the channel state module 408, the transceiver 410, and the modem 412 to perform aspects of the block 1104.

In some aspects, the channel state report may be based on the plurality of first reference signals, and may include a first CQI for the first RI and a first PMI, and a second CQI for the second RI (which may different than the first RI) and a second PMI (which may be different than the first PMI). The first CQI for the first RI and the first PMI, and the second CQI for the second RI and the second PMI, may be based on the set of measurement resources. The channel state report may also include a first MCS for the first RI and a second MCS for the second RI, the first MCS and second MCS being based on the set of measurement resources. The channel state report may also include a history of CQIs based on the set of measurement resources at a plurality of time instants. The channel state report may also include a history of channel state feedbacks—which may include the plurality of expected CQIs—based on the set of measurement resources and the at least one of precoding information or rank indications. Each channel state feedback may be associated with a timestamp.

At block 1106, the BS 105 may also determine a link adaptation (e.g., an OLLA) for the first UE based at least in part on the channel state report. As part of determining the link adaptation, the channel state module 408 may determine an update for a precoding matrix indicator PMI, RI, and/or MCS for the first UE 115. In some instances, the BS 105 may utilize one or more components, such as the processor 402, the memory 404, the channel state module 408, the transceiver 410, and the modem 412 to perform aspects of the block 1106.

Figure 12:
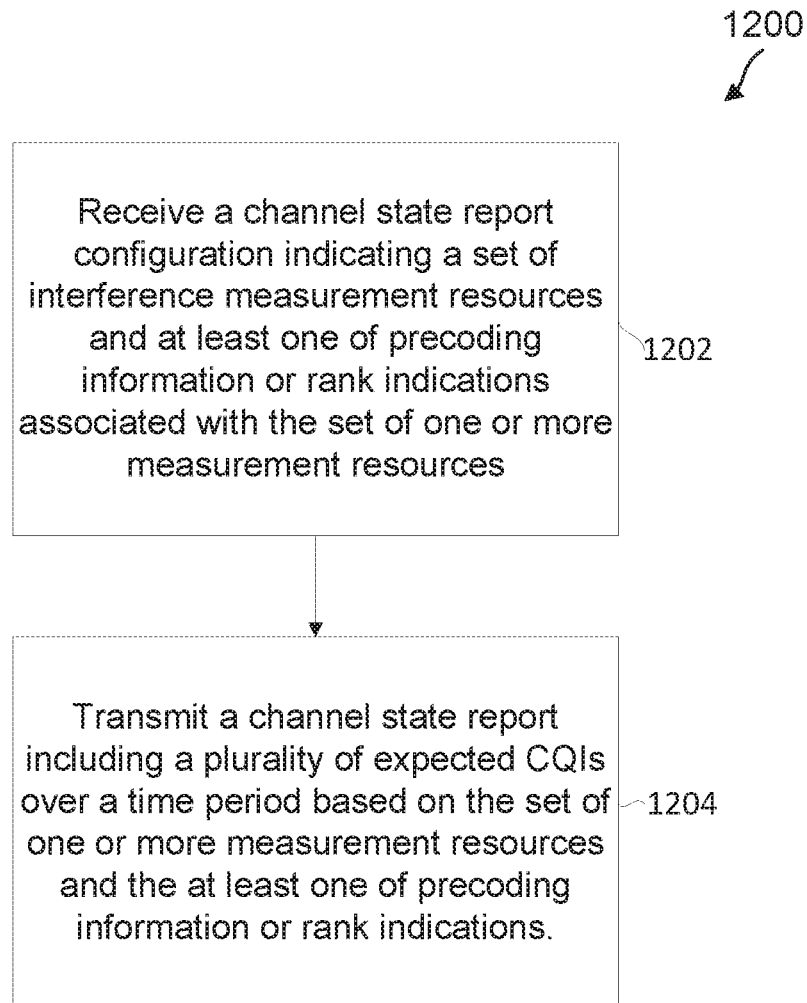
FIG. 12 is a flow diagram of wireless communication according to some aspects of the present disclosure.

FIG. 12 is a flow diagram of wireless communication method 1200 according to some aspects of the present disclosure. Aspects of the method 1200 can be executed by a computing device (e.g., a processor, processing circuit, and/or other suitable component) of a wireless communication device or other suitable means for performing the steps. For example, a wireless communication device, such as a UE 115, 215, or 500, may utilize one or more components, such as the processor 502, the memory 504, the channel state module 508, the transceiver 510, the modem 512, and the one or more antennas 516, to execute the steps of method 1200. The method 1200 may employ similar mechanisms as in the sequence 600, the scheme 700, and the sequence 800 described above with respect to FIGS. 6-8. As illustrated, the method 1200 includes several enumerated steps, but aspects of the method 1200 may include additional steps before, after, and in between the enumerated steps. In some aspects, one or more of the enumerated steps may be omitted or performed in a different order.

At block 1202, the UE 115 may receive, from a BS 105, a channel state report configuration indicating a set of one or more measurement resources and at least one of precoding information or rank indications associated with the set of one or more measurement resources. In some instances, the UE 115 may utilize one or more components, such as the processor 502, the memory 504, the channel state module 508, the transceiver 510, and the modem 512 to perform aspects of the block 1202.

In some aspects, the UE 115 may also receive an indication of a first RI and/or a first PMI for which the BS 105 desires feedback. The UE 115 may also receive an indication of a quantity of channel state feedbacks the UE 115 is to transmit to the BS 105 as part of a history of channel feedbacks.

At block 1204, the UE may transmit to the BS 105 a channel state report including a plurality of expected CQIs over a time period based on the set of measurement resources and the at least one of precoding information or rank indications. In some instances, the UE 115 may utilize one or more components, such as the processor 502, the memory 504, the channel state module 508, the transceiver 510, and the modem 512 to perform aspects of the block 1204.

The report may include a first CQI for the first RI and a second CQI for the second RI (where the first and second RIs are different), based on the set of measurement resources. The report may also include a first CQI for a first PMI and a second CQI for a second PMI (where the first and second PMIs are different), based on the set of measurement resources. The report may also include a first MCS for the first RI and a second MCS for the second RI, based on the set of measurement resources. The report may also include a history of CQIs based on the set of measurement resources at a plurality of time instants. The report may also include the history of channel state feedbacks including the plurality of expected CQIs based on the set of measurement resources and the at least one of precoding information or rank indications. Further, each channel state feedback may be associated with a timestamp.

The UE 115 may also receive, from the BS 105, scheduling information including a PMI, RI, and/or MCS based on the channel state report transmitted by the UE 115.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
 transmitting, by a base station (BS) to a first user equipment (UE) of a plurality of UEs, a channel state report configuration indicating a set of one or more measurement resources and at least one of precoding information or rank indications associated with the set of one or more measurement resources;
 transmitting, by the BS to the first UE at different times over a time period, a plurality of first reference signals in a first channel response measurement resource different from the set of one or more measurement resources;

receiving, by the BS from the first UE, a channel state report including a plurality of predicted channel quality indicators (CQIs) over the time period, wherein the plurality of predicted CQIs is based on the set of one or more measurement resources, one or more of the plurality of first reference signals, and the at least one of the precoding information or rank indications; and communicating, by the BS with the first UE based at least in part on the received channel state report.

2. The method of claim 1, wherein the receiving the channel state report includes:
receiving, by the BS from the first UE, the channel state report including the plurality of predicted CQIs, the plurality of predicted CQIs including:
a first channel quality indicator (CQI) for a first rank indicator (RI) and a first precoding matrix (PMI); and
a second CQI for a second RI different than the first RI and a second PMI different than the first PMI, the first PMI for the first RI and the second PMI for the second RI being based on the set of one or more measurement resources.

3. The method of claim 2, further comprising:
transmitting, by the BS to the first UE, an indication of the first RI and first PMI.

4. The method of claim 1, wherein the receiving the channel state report includes:
receiving, by the BS from the first UE, the channel state report including the plurality of predicted CQIs including a first channel quality indicator (CQI) for a first precoding matrix indicator (PMI) and a second CQI for a second PMI different than the first PMI, the first CQI for the first PMI and the second CQI for the second PMI being based the set of one or more measurement resources.

5. The method of claim 4, further comprising:
transmitting, by the BS to the first UE, an indication of the first PMI and the second PMI.

6. The method of claim 1, wherein the receiving the channel state report includes:
receiving, by the BS from the first UE, the channel state report including the plurality of predicted CQIs including a first modulation coding scheme (MCS) for a first rank indicator (RI) and a second MCS for a second RI different than the first RI, the first MCS for the first RI and the second MCS for the second RI being based on the set of one or more measurement resources.

7. The method of claim 1, wherein the receiving the channel state report includes:
receiving, by the BS from the first UE, the channel state report including the plurality of predicted CQIs including a history of CQIs based on the set of one or more measurement resources at a plurality of time instants.

8. The method of claim 1, wherein the receiving the channel state report includes:
receiving, by the BS from the first UE, the channel state report including a history of channel state feedbacks based on the set of one or more measurement resources and the precoding information, the history of channel state feedbacks including the plurality of predicted CQIs.

9. The method of claim 8, wherein each channel state feedback of the history of channel state feedbacks is associated with a timestamp.

10. The method of claim 9, further comprising:
transmitting, by the BS to the first UE, an indication of a quantity of the channel state feedbacks for the channel state report.

11. The method of claim 1, further comprising:
determining, by the BS, a link adaptation for the first UE including an update for at least one of a precoding matrix indicator (PMI), a rank indicator (RI), or a modulation coding scheme (MCS) for the first UE based at least in part on the received channel state report.

12. A method of wireless communication, comprising:
receiving, by a user equipment (UE) from a base station (BS), a channel state report configuration indicating a set of one or more measurement resources and at least one of precoding information or rank indications associated with the set of one or more measurement resources;

receiving, by the UE from the BS at different times over a time period, a plurality of first reference signals in a first channel response measurement resource different from the set of one or more measurement resources; and transmitting, by the UE to the BS, a channel state report including a plurality of predicted channel quality indicators (CQIs) over a time period, wherein the plurality of predicted CQIs is based on the set of one or more measurement resources, one or more of the plurality of first reference signals, and the at least one of the precoding information or rank indications.

13. The method of claim 12, wherein the transmitting the channel state report includes:
transmitting, by the UE to the BS, the channel state report including the plurality of predicted CQIs including a first channel quality indicator (CQI) for a first rank indicator (RI) and a second CQI for a second RI different than the first RI, the first CQI for the first RI and the second CQI for the second RI being based on a predicted interference associated with the set of one or more measurement resources.

14. The method of claim 13, further comprising:
receiving, by the UE from the BS, an indication of the first RI.

15. The method of claim 12, wherein the transmitting the channel state report includes:
transmitting, by the UE to the BS, the channel state report including the plurality of predicted CQIs including a first channel quality indicator (CQI) for a first precoding matrix indicator (PMI) and a second CQI for a second PMI different than the first PMI, the first CQI for the first PMI and the second CQI for the second PMI being based on the set of one or more measurement resources.

16. The method of claim 15, further comprising:
receiving, by the UE from the BS, an indication of the first PMI.

17. The method of claim 12, wherein the transmitting the channel state report includes:
transmitting, by the UE to the BS, the channel state report including the plurality of predicted CQIs including a first modulation coding scheme (MCS) for a first rank indicator (RI) and a second MCS for a second RI different than the first RI, the first MCS for the first RI and the second MCS for the second RI being based on the set of one or more measurement resources.

18. The method of claim 12, wherein the transmitting the channel state report includes:

transmitting, by the UE to the BS, the channel state report including the plurality of predicted CQIs including a history of CQIs based on the set of one or more measurement resources at a plurality of time instants.

19. The method of claim 12, wherein the transmitting the channel state report includes:
   transmitting, by the UE to the BS, the channel state report including a history of channel state feedbacks including the plurality of predicted CQIs based on the set of one or more measurement resources and the precoding information.

20. The method of claim 19, wherein each channel state feedback of the history of channel state feedbacks is associated with a timestamp.

21. The method of claim 20, further comprising:
   receiving, by the UE from the BS, an indication of a quantity of the channel state feedbacks for the channel state report.

22. The method of claim 12, further comprising:
   receiving, by the UE, scheduling information including at least one of a precoding matrix indicator (PMI), a rank indicator (RI), or a modulation coding scheme (MCS) based on the received channel state report.

23. A base station (BS), comprising:
   a transceiver configured to:
      transmit, to a first user equipment (UE) of a plurality of UEs, a channel state report configuration indicating a set of one or more measurement resources and at least one of precoding information or rank indications associated with the set of one or more measurement resources;
      transmit, to the first UE at different times over a time period, a plurality of first reference signals in a first channel response measurement resource different from the set of one or more measurement resources; and
      receive, from the first UE, a channel state report including a plurality of predicted channel quality indicators (CQIs) over the time period, wherein the plurality of predicted CQIs is based on the set of one or more measurement resources, one or more of the plurality of first reference signals, and the at least one of the precoding information or rank indications; and
      communicate with the first UE based at least in part on the received channel state report.

24. The BS of claim 23, wherein:
   the transceiver is further configured to:
      transmit to the first UE, an indication of a first RI and a second RI different than the first RI; and
   the transceiver configured to receive the channel state report is further configured to:
      receive the channel state report including the plurality of predicted CQIs including a first channel quality indicator (CQI) for the first RI and a second CQI for the second RI, the first CQI for the first RI and the second CQI for the second RI being based on the set of one or more measurement resources.

25. A user equipment (UE), comprising:
   a transceiver configured to:
      receive, from a base station (BS), a channel state report configuration indicating a set of one or more measurement resources and at least one of precoding information or rank indications associated with the set of one or more measurement resources;
      receive, from the BS at different times over a time period, a plurality of first reference signals in a first channel response measurement resource different from the set of one or more measurement resources; and
      transmit, to the BS, a channel state report including a plurality of predicted channel quality indicators (CQIs) over the time period, wherein the plurality of predicted CQIs is based on the set of one or more measurement resources, one or more of the plurality of first reference signals, and the at least one of the precoding information or rank indications.

26. The UE of claim 25, wherein:
   the transceiver is further configured to:
      receive, from the BS, an indication of a first RI and a second RI different than the first RI; and
   the transceiver configured to transmit the channel state report is further configured to:
      transmit the channel state report including the plurality of predicted CQIs including a first channel quality indicator (CQI) for the first RI and a second CQI for the second RI different than the first RI, the first CQI for the first RI and the second CQI for the second RI being based on the set of one or more measurement resources.

* * * * *